United States Patent
Aminaka et al.

(10) Patent No.: US 10,575,228 B2
(45) Date of Patent: Feb. 25, 2020

(54) RADIO COMMUNICATION SYSTEM, BASE STATION, MOBILE STATION, COMMUNICATION CONTROL METHOD, AND COMPUTER READABLE MEDIUM

(71) Applicant: NEC Corporation, Tokyo (JP)

(72) Inventors: Hiroaki Aminaka, Tokyo (JP); Hisashi Futaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/655,961

(22) PCT Filed: Aug. 6, 2013

(86) PCT No.: PCT/JP2013/004744
§ 371 (c)(1),
(2) Date: Jun. 26, 2015

(87) PCT Pub. No.: WO2014/103097
PCT Pub. Date: Jul. 3, 2014

(65) Prior Publication Data
US 2015/0341836 A1 Nov. 26, 2015

(30) Foreign Application Priority Data
Dec. 28, 2012 (JP) .................................. 2012-288210

(51) Int. Cl.
*H04W 36/08* (2009.01)
*H04W 36/00* (2009.01)
(Continued)

(52) U.S. Cl.
CPC ....... *H04W 36/08* (2013.01); *H04W 36/0044* (2013.01); *H04W 36/30* (2013.01);
(Continued)

(58) Field of Classification Search
CPC ......... H04L 47/10; H04L 47/14; H04L 47/30; H04L 47/263; H04W 72/1284; H04W 28/12
(Continued)

(56) References Cited

U.S. PATENT DOCUMENTS

| | | | |
|---|---|---|---|
| 6,097,709 A * | 8/2000 | Kuwabara | H04B 7/2696 370/331 |
| 2010/0027507 A1* | 2/2010 | Li | H04W 36/0055 370/331 |

(Continued)

FOREIGN PATENT DOCUMENTS

| | | |
|---|---|---|
| CN | 101938798 | 1/2011 |
| CN | 102833802 | 12/2012 |

(Continued)

OTHER PUBLICATIONS

H. Ishii et al., "A Novel Architecture for LTE-B C-plane/U-plane Split and Phantom Cell Concept",, IEEE Globecom Workshops, pp. 624-630, Dec. 2012.

(Continued)

*Primary Examiner* — Faruk Hamza
*Assistant Examiner* — Jean F Voltaire
(74) *Attorney, Agent, or Firm* — Finnegan, Henderson, Farabow, Garrett & Dunner, L.L.P.

(57) ABSTRACT

A first base station (1) is configured to send, to a second base station (2), first configuration information that is necessary to establish a data bearer and a data radio bearer in the second base station (2) for a C/U-plane split scenario. Further, the first base station (1) is configured to send, to a third base station (3), configuration information (e.g., LPN information) regarding the data bearer established in the second base station (2) when a mobile station (4) moves from a first cell (10) to a third cell (30) (S103 and S104). It (Continued)

is thus, for example, possible to contribute to a reduction in wasted signaling when a UE moves between cells in the C/U-plane split scenario.

7 Claims, 19 Drawing Sheets

(51) Int. Cl.
    *H04W 36/30*     (2009.01)
    *H04W 76/32*     (2018.01)
    *H04W 48/20*     (2009.01)
    *H04W 88/08*     (2009.01)
    *H04W 76/10*     (2018.01)
    *H04W 24/10*     (2009.01)
    *H04L 29/06*     (2006.01)

(52) U.S. Cl.
    CPC ......... *H04W 76/32* (2018.02); *H04L 65/1063* (2013.01); *H04W 24/10* (2013.01); *H04W 48/20* (2013.01); *H04W 76/10* (2018.02); *H04W 88/08* (2013.01)

(58) Field of Classification Search
    USPC .......................................................... 370/331
    See application file for complete search history.

(56) References Cited

U.S. PATENT DOCUMENTS

| | | | | |
|---|---|---|---|---|
| 2010/0039987 A1* | 2/2010 | Hegde | ................... | H04W 40/02 370/328 |
| 2011/0177815 A1* | 7/2011 | Jeong | ................... | H04W 48/14 455/436 |
| 2012/0320817 A1* | 12/2012 | Xu | ................... | H04W 8/08 370/315 |
| 2013/0010702 A1 | 1/2013 | Aminaka | | |
| 2014/0004863 A1* | 1/2014 | Zhang | ............... | H04W 36/0033 455/444 |
| 2014/0126539 A1* | 5/2014 | Adachi | ................ | H04W 36/08 370/331 |
| 2017/0332321 A1* | 11/2017 | Zhang | ................... | H04L 5/0035 |

FOREIGN PATENT DOCUMENTS

| | | | | |
|---|---|---|---|---|
| JP | 2004-535143 A | 11/2004 | | |
| WO | WO 2011/021595 A1 | 2/2011 | | |
| WO | WO 2011/108637 A1 | 9/2011 | | |
| WO | WO 2011/125278 A1 | 10/2011 | | |
| WO | WO 2011/137784 A1 * | 11/2011 | | |
| WO | WO-2011137784 A1 * | 11/2011 | ........ | H04W 36/0033 |
| WO | WO 2011/149316 A2 | 12/2011 | | |

OTHER PUBLICATIONS

Y. Kishiyama et al., "Evolution Concept and Candidate Technologies for Future Steps of LTE-A", Communication Systems (ICCS), IEEE International Conference on, pp. 473-477, Nov. 2012.

Extended European Search Report dated Jun. 15, 2016, by the European Patent Office in counterpart European Patent Application No. 13866779.5.

NTT Docomo, Inc., "Requirements, Candidate Solutions & Technology Roadmap for LTE Rel-12 Onward", RWS-120010, 3GPP Workshop on Release 12 and onwards, pp. 1-27, Jun. 2012.

Mediatek Inc., "Handover with Carrier Aggregation", 3GPP TSG-RAN WG2 #69, R2-101144, pp. 1-6, Feb. 2010.

International Search Report dated Oct. 1, 2013 in corresponding PCT International Application.

Office Action mailed by the Chinese Patent Office in couterpart Chinese Patent Application No. 201380068870.6, dated Nov. 16, 2017.

NEC, 3GPP TSG-RAN WG3 Meeting #79, R3-130138, St. Julien's, Malta, "Consideration of the Possible Structures on the Dual Connectivity", Jan. 28-Feb. 1, 2013.

New Postcom, 3GPP TSG-RAN WG3 AH Meeting, R3-101850, Beijing, China, "Discussion of Enhanced Mobility Solutions Between MeNB and HeNB", Jun. 29-Jul. 1, 2010.

Decision to Grant a Patent from the Japanese Patent Office in Counterpart Japanese Application No. JP-2014-554067, dated May 16, 2017.

Japanese Office Action mailed by the Japanese Patent Office in counterpart Japanese Patent Application No. 2018-231666, dated Aug. 20, 2019.

* cited by examiner

RADIO COMMUNICATION SYSTEM, BASE STATION, MOBILE STATION, COMMUNICATION CONTROL METHOD, AND COMPUTER READABLE MEDIUM

CROSS-REFERENCE TO RELATED PATENT APPLICATIONS

This application is a National Stage Entry of International Application No. PCT/JP2013/004744, filed Aug. 6, 2013, which claims priority from Japanese Patent Application No. 2012-288210, filed Dec. 28, 2012. The entire contents of the above-referenced applications are expressly incorporated herein by reference.

TECHNICAL FIELD

The present invention relates to a radio communication system, and more particularly, to network architecture in a small cell enhancement scenario.

BACKGROUND ART

In the Long Term Evolution (LTE) Release 12 according to the 3rd Generation Partnership Project (3GPP), "local area enhancement" or "small cell enhancement" for accommodation of a large amount of local traffic, improvement in throughput, and efficient use of a high-frequency band has become one of the subjects for discussion (see Non-patent literature 1). In the local area enhancement or the small cell enhancement, a low-power node (LPN) that forms a small cell is used.

Further, a C/U-plane split scenario has been proposed regarding the small cell enhancement. In the C/U-plane split, a macro cell provides a control plane (e.g., Radio Resource Control (RRC) connection, and Non-Access Stratum (NAS) message transfer) for a mobile station (User Equipment (UE)) and a small cell provides a user plane for the UE. In one specific example of the C/U-plane split scenario, for the Control plane (C-plane), the macro cell can keep a good connection with the UE by a wide coverage using a low frequency band and support mobility of the UE. Meanwhile, for the user plane (U-plane), the small cell can provide a local high throughput for the UE by using a wide bandwidth in a high frequency band.

In the C/U-plane split scenario, a case in which a small cell does not require transmission of existing cell specific signals/channels (e.g., Primary Synchronization Signal (PSS), Secondary Synchronization Signal (SSS), Cell-specific Reference Signal (CRS), Master Information Block (MIB), and System Information Block (SIB)) is also assumed. Such a new small cell may be referred to as a phantom cell. Further, a base station (eNB) or an LPN that provides a small cell may be referred to as a Phantom eNodeB (PhNB).

CITATION LIST

Non Patent Literature

[Non-Patent Literature 1] 3GPP RWS-120010, NTT DOCOMO, "Requirements, Candidate Solutions & Technology Roadmap for LTE Rel-12 Onward", 3GPP TSG RAN Workshop on Rel-12 and Onwards Ljubljana, Slovenia, 11-12 Jun. 2012

SUMMARY OF INVENTION

Technical Problem

As described above, the C/U-plane split scenario in which the C-plane is provided for UEs in a cell controlled by the MeNB and the U-plane is provided for the UEs in a cell controlled by the LPN has been proposed. In the following description, a cell that provides the C-Plane in the C/U-plane split scenario is referred to as a primary cell (PCell) and a cell that provides the U-Plane in the C/U-plane split scenario is referred to as a secondary cell (SCell).

The present inventors have studied about an inter-cell movement of the UE in the C/U-plane split scenario and have found various problems therewith. Consider a case in which a UE that is performing the C/U-plane split moves from an MeNB cell (PCell), which provides the C-Plane services to the UE, to another MeNB cell in the C/U-plane split scenario. If a normal handover procedure is applied to this case, there is a problem that wasted signaling for path switch (i.e., change of a data bearer route) occurs. This is because, since the U-Plane (data bearer) of the UE is established in the LPN cell (SCell) in the C/U-plane split scenario, there is no need to change the U-Plane in the handover between MeNBs. Accordingly, when the normal handover procedure is performed, signaling for the path switch of the U-Plane (i.e., change of a data bearer route) is wasted. Therefore, special considerations must be taken in the C/U-plane split scenario.

One object of the present invention is to provide a radio communication system, a base station, a mobile station, a communication control method, and a program which contribute to a reduction in wasted signaling when a UE moves between cells in the C/U-plane split scenario.

Solution to Problem

In a first aspect, a radio communication system includes first to third base stations, a core network, and a mobile station. The core network includes a mobility management apparatus and a data transfer apparatus. The first to third base stations operate first to third cells, respectively. The first base station is configured to establish a first signaling bearer with the mobility management apparatus, establish a second signaling bearer with the second base station, and establish a signaling radio bearer with the mobile station in the first cell. The second base station is configured to establish the second signaling bearer with the first base station, establish a data bearer with the data transfer apparatus, and establish a data radio bearer with the mobile station in the second cell. The first base station is further configured to send, to the second base station via the second signaling bearer, first configuration information that is necessary to establish the data bearer and the data radio bearer in the second base station. The first base station is further configured to send, to the third base station, second configuration information regarding the data bearer established in the second base station when the mobile station moves from the first cell to the third cell.

In a second aspect, a first base station includes a radio communication unit that operates a first cell, and a controller. The controller is configured to perform control to establish a first signaling bearer with a mobility management apparatus in a core network, establish a second signaling bearer with a second base station that operates a second cell, and establish a signaling radio bearer with a mobile station in the first cell. The controller is further configured to send, to the second base station via the second signaling bearer, first configuration information that is necessary to establish a data bearer and a data radio bearer in the second base station. The controller is further configured to send, to a third base station, second configuration information regarding the data bearer established in the second base station when the mobile station moves from the first cell to a third cell operated by the third base station. The data bearer is established between the second base station and a data transfer apparatus in the core network. The data radio bearer is established between the second base station and the mobile station in the second cell.

In a third aspect, a mobile station is used in combination with the radio communication system according to the above first aspect, and includes a radio communication unit and a controller. The controller is configured to control the radio communication unit to receive configuration information regarding the data radio bearer from the first base station and receive or transmit user data using the second cell.

In a fourth aspect, a communication control method in a first base station that operates a first cell includes the following (a) to (c):

(a) performing control to establish a first signaling bearer with a mobility management apparatus in a core network, establish a second signaling bearer with a second base station that operates a second cell, and establish a signaling radio bearer with a mobile station in the first cell;

(b) sending, to the second base station via the second signaling bearer, first configuration information that is necessary to establish a data bearer and a data radio bearer in the second base station, wherein the data bearer is established between the second base station and a data transfer apparatus in the core network, and the data radio bearer is established between the second base station and the mobile station in the second cell; and (c) sending, to a third base station, second configuration information regarding the data bearer established in the second base station when the mobile station moves from the first cell to a third cell operated by the third base station.

In a fifth aspect, a program includes instructions for causing a computer to perform the communication control method according to the above fourth aspect.

Advantageous Effects of Invention

According to the above aspects, it is possible to provide a radio communication system, a base station, a mobile station, a communication control method, and a program which contribute to a reduction in wasted signaling when a UE moves between cells in the C/U-plane split scenario.

DESCRIPTION OF EMBODIMENTS

Hereinafter, with reference to the drawings, specific embodiments will be described in detail. Throughout the drawings, identical or corresponding components are denoted by the same reference symbols, and overlapping descriptions will be omitted as appropriate for the sake of clarification of description.

First Embodiment

Figure 1:
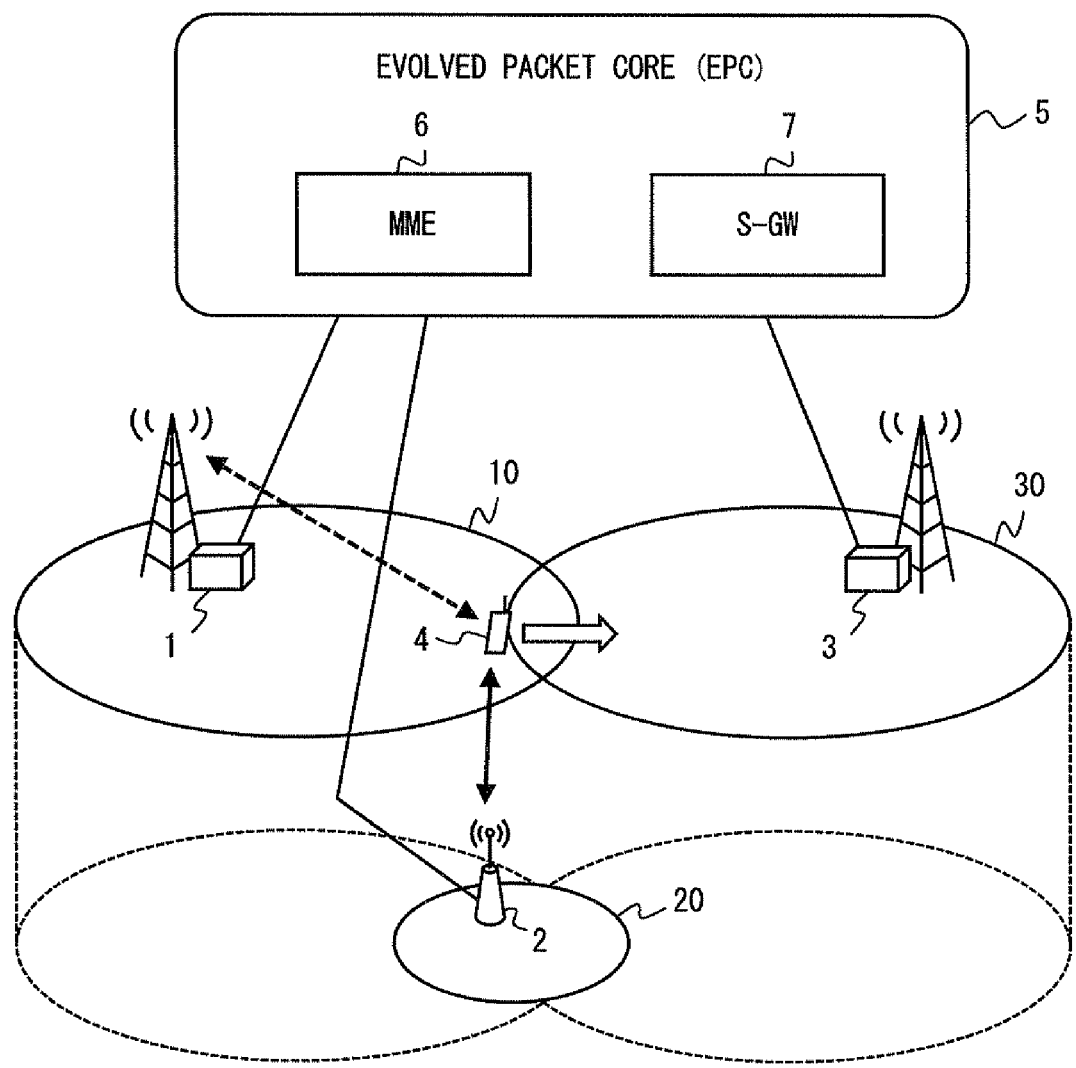
FIG. 1 is a diagram showing a configuration example of a radio communication system (e.g., LTE system) according to a first embodiment.

FIG. 1 shows a configuration example of a radio communication system according to this embodiment. The radio communication system according to the embodiment includes a first base station 1, a second base station 2, a third base station 3, a mobile station 4, and a core network 5. The base stations 1 to 3 operate a first cell 10, a second cell 20, and a third cell 30, respectively. The core network 5 includes a mobility management apparatus 6 and a data transfer apparatus 7. In the following description, for the sake of simplification of the description, a case in which the radio communication system according to the embodiment is an LTE system will be described as an example. Accordingly, the first base station 1 corresponds to an MeNB, the second base station 2 corresponds to an LPN, the third base station 3 corresponds to an MeNB, the mobile station 4 corresponds to a UE, the core network 5 corresponds to an Evolved Packet Core (EPC), the mobility management apparatus 6 corresponds to a Mobility Management Entity (MME), and the data transfer apparatus 7 corresponds to a Serving Gateway (S-GW).

The radio communication system according to the embodiment applies the C/U-plane split to the cells 10 and 20. That is, the LPN 2 provides U-plane services for the UE 4 in the cell 20. In other words, the LPN 2 establishes a data radio bearer (DRB) with the UE 4 and transfers user data of the UE 4. The MeNB 1 provides C-Plane services in the cell 10 for the UE 4 which establishes the DRB with the LPN 2. In other words, the MeNB 1 establishes a signaling radio bearer (SRB) with the UE 4 and provides RRC signaling, for example, to establish and modify the DRB in the cell 20 of the LPN 2, and NAS message transfer between the EPC 5 and the UE 4. The MeNB 1 may transmit, on a downlink channel (e.g., Physical Broadcast Channel (PBCH) or Physical Downlink Shared Channel (PDSCH)) of the cell 10, master information (e.g., system bandwidth, and the number of transmission antennas) and system information (e.g., parameters regarding the DRB in the cell 20) regarding the cell 20 of the LPN 2.

Similar to the MeNB 1, the MeNB 3 has an ability to provide the C-Plane services in the cell 30 for the UE 4 that performs the C/U-plane split. In this embodiment, as shown in FIG. 1, an example in which the LPN cell 20 is deployed across the two MeNB cells 10 and 30 is assumed. Therefore, the MeNB 3 can provide the C-Plane services in the cell 30 for the UE 4 that establishes the DRB with the LPN 2.

The MeNBs 1 and 3 may not provide all the C-plane services regarding the UE 4. For example, the LPN 2 may control a layer 1 (physical layer) and a layer 2 (Media Access Control (MAC) sublayer and Radio Link Control (RLC) sublayer) regarding the data radio bearer that is established for the LPN 2. Specifically, the LPN 2 may receive layer 1/layer 2 control signals (e.g., Hybrid Automatic Repeat Request (H-ARQ) ACK, Channel Quality Indicator (CQI), Precoding Matrix Indicator (PMI), and Rank Indicator (RI)) using an uplink control channel (e.g., Physical Uplink Control Channel (PUCCH)) or an uplink data channel (e.g., Physical Uplink Shared Channel (PUSCH)). The LPN 2 may transmit downlink scheduling information, ACK/NACK for uplink transmission and the like to the UE 4 using a downlink control channel (e.g., Physical Downlink Control Channel (PDCCH)).

The EPC 5 is a network that is generally managed by an operator that provides mobile communication services. The EPC 5 has control plane (C-plane) functions including mobility management (e.g., location registration, location update) and bearer management (e.g., bearer establishment, bearer modification, bearer release) of the UE 4, and user plane (U-plane) functions including transferring user data of the UE 4 between the MeNB 1 and an external network (not shown), between the LPN 2 and the external network, and between the MeNB 3 and the external network. The MME 6 contributes to the C-plane functions in the EPC. The S-GW 7 contributes to the U-plane functions in the EPC. The S-GW 7 is arranged at a boundary between the EPC 5 and a radio access network (RAN) including the MeNB 1, the LPN 2, and the MeNB 3.

Figure 2:
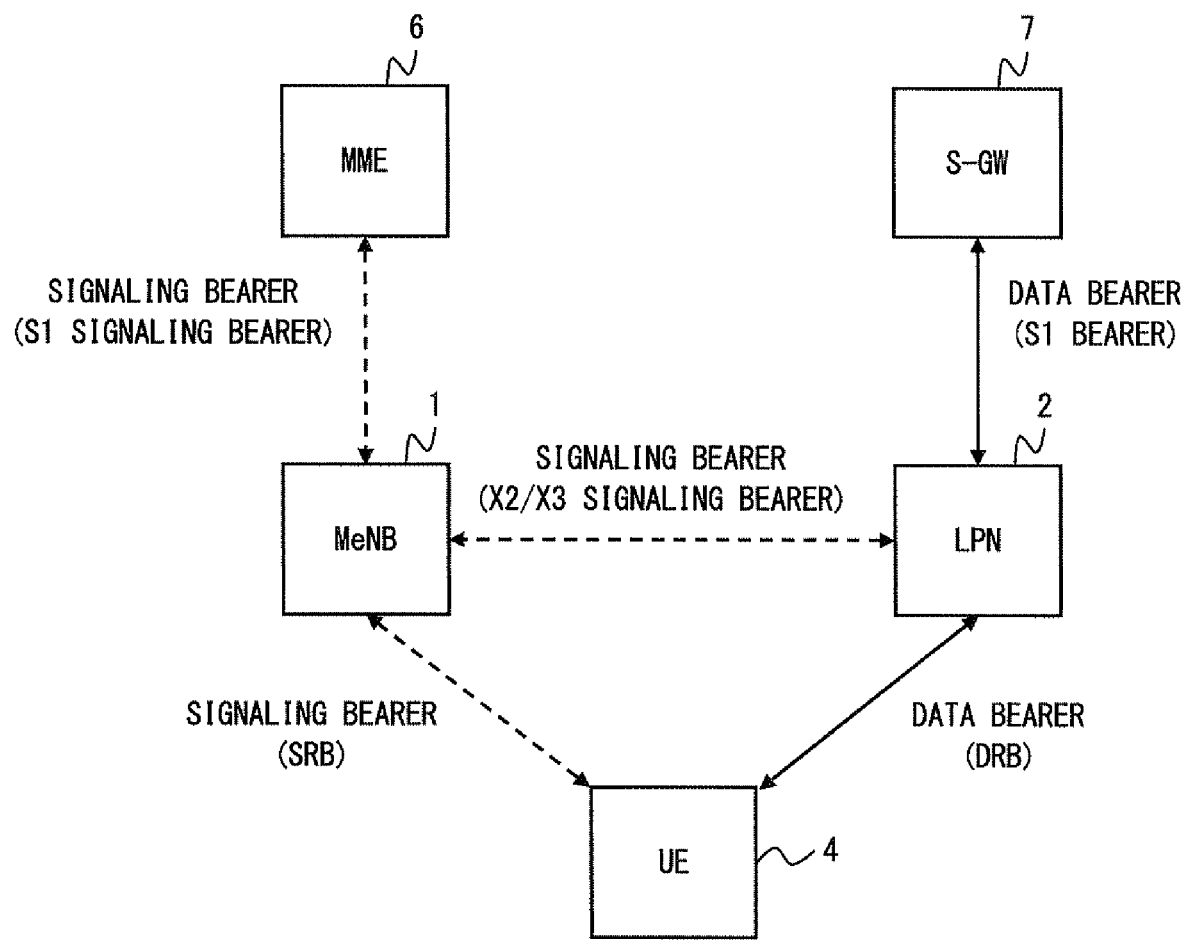
FIG. 2 is a diagram showing one example of bearer architecture in the radio communication system according to the first embodiment.

In the following description, with reference to FIGS. 2 and 3, the bearer architecture according to this embodiment will be described. While a case in which the C/U-Plane split is performed between the MeNB 1 and the LPN 2 will be described here, the similar bearer architecture may be applied also to a case in which the C/U-Plane split is performed between the eNB 3 and the LPN 2. FIG. 2 shows a first example of the bearer architecture related to the user data transfer in the cell 20. The radio bearer has already been described above. That is, the MeNB 1 establishes the SRB with the UE 4, and provides, in the cell 10, C-plane services including RRC signaling, for example, to establish and modify the DRB on the cell 20 and NAS message transfer between the EPC 5 and the UE 4. Meanwhile, the LPN 2 establishes the DRB with the UE 4 and transmits and receives the user data of the UE 4 in the cell 20.

Next, bearers between the EPC 5 and RAN nodes (i.e., the MeNB 1, the LPN 2, and the MeNB 3) will be described. A signaling bearer (i.e., S1 signaling bearer using an S1-MME interface) with the EPC 5 is established between the MME 6 and the MeNB 1. The MeNB 1 establishes the S1 signaling bearer with the MME 6 and sends and receives S1 Application Protocol (S1-AP) messages to and from the MME 6. Meanwhile, a data bearer (i.e., S1 bearer using an S1-U interface) with the EPC 5 is established between the S-GW 7 and the LPN 2. The LPN 2 establishes the S1 bearer with the S-GW 7 and sends and receives user data of the UE 4 to and from the S-GW 7.

Further, the MeNB 1 establishes a signaling bearer with the LPN 2. The signaling bearer between the MeNB 1 and the LPN 2 is established using, for example, an X2 interface. The X2 interface is an interface between eNBs. A case in which the LPN 2 is defined as a new node and a new interface different from the X2 interface is defined between the eNB and the LPN may be considered. In this case, the signaling bearer between the MeNB 1 and the LPN 2 may be established using this new interface. In this specification, this new interface is provisionally referred to as an X3 interface. The MeNB 1 is configured to send, to the LPN 2 via an X2/X3 signaling bearer, bearer configuration information (hereinafter referred to as E-UTRAN Radio Access Bearer (E-RAB) configuration information) that is necessary to establish the S1 bearer with the S-GW 7 and the DRB with the UE 4 in the LPN 2. The E-RAB is a radio access bearer including the DRB and the S1 bearer.

According to the bearer architecture shown in FIG. 2, the LPN 2 does not require the S1 signaling bearer with the MME 6 and can set up the DRB and the S1 bearer based on E-RAB configuration information supplied from the MeNB 1. In addition, in the above-mentioned bearer architecture, a termination point of the S1 bearer (S1-U bearer) is different from a termination point of the S1 signaling bearer. That is, the LPN 2, not the MeNB 1, terminates the S1 bearer. That is, in the architecture shown in FIG. 2, the C/U planes are separated not only with regard to the signaling in the RAN but also with regard to interfaces between the EPC 5 and the RAN. As a result of this, the MeNB 1 is only required to perform signaling to establish the S1 bearer and the DRB necessary for the UE 4 to transmit and receive user data via the cell 20 and the LPN 2. In other words, in one example, the MeNB 1 needs not to terminate the S1 bearer (i.e., GPRS Tunneling Protocol (GTP) tunnel) for the communication of the UE 4 via the cell 20, and also needs not to perform forwarding of user data packets between the S1 bearer and the DRB. These processing are performed by the LPN 2. Accordingly, in one example, it is possible to reduce the processing load on the MeNB 1.

The S1 bearer is a GTP tunnel and the user data (data packet) is encapsulated in GTP tunnel packets to be transferred between the S-GW 7 and the LPN 2. For example, the GTP tunnel packets that encapsulate downlink user data arrive at the LPN 2 by being subjected to routing and forwarding by routers arranged between the S-GW 7 and the LPN 2. Accordingly, in the bearer architecture shown in FIG. 2, typically, the GTP tunnel packets are transferred without passing through the MeNB 1. In this case, the MeNB 1 need not carry out processing for terminating the S1 bearer and thus it is possible to reduce the processing load on the MeNB 1. Further, since the GTP tunnel packets do not flow through the X2/X3 interface between the MeNB 1 and the LPN 2, performance requirements on the capacity, the delay and the like of the X2/X3 interface are relaxed. It is possible, for example, to use a non-optical fiber line (e.g., wireless communication path) for the X2/X3 interface.

However, in some implementations, the GTP tunnel packets that encapsulate the user data may be transferred between the S-GW 7 and the LPN 2 via the MeNB 1. In this case, the MeNB 1 may function as a router (e.g., Internet Protocol (IP) router) and may perform routing and forwarding of the GTP tunnel packets. The routing of the GTP tunnel packets that pass through the MeNB 1 can be achieved by setting up routing tables included in the S-GW 7, the LPN 2, and the MeNB 1.

Figure 3:
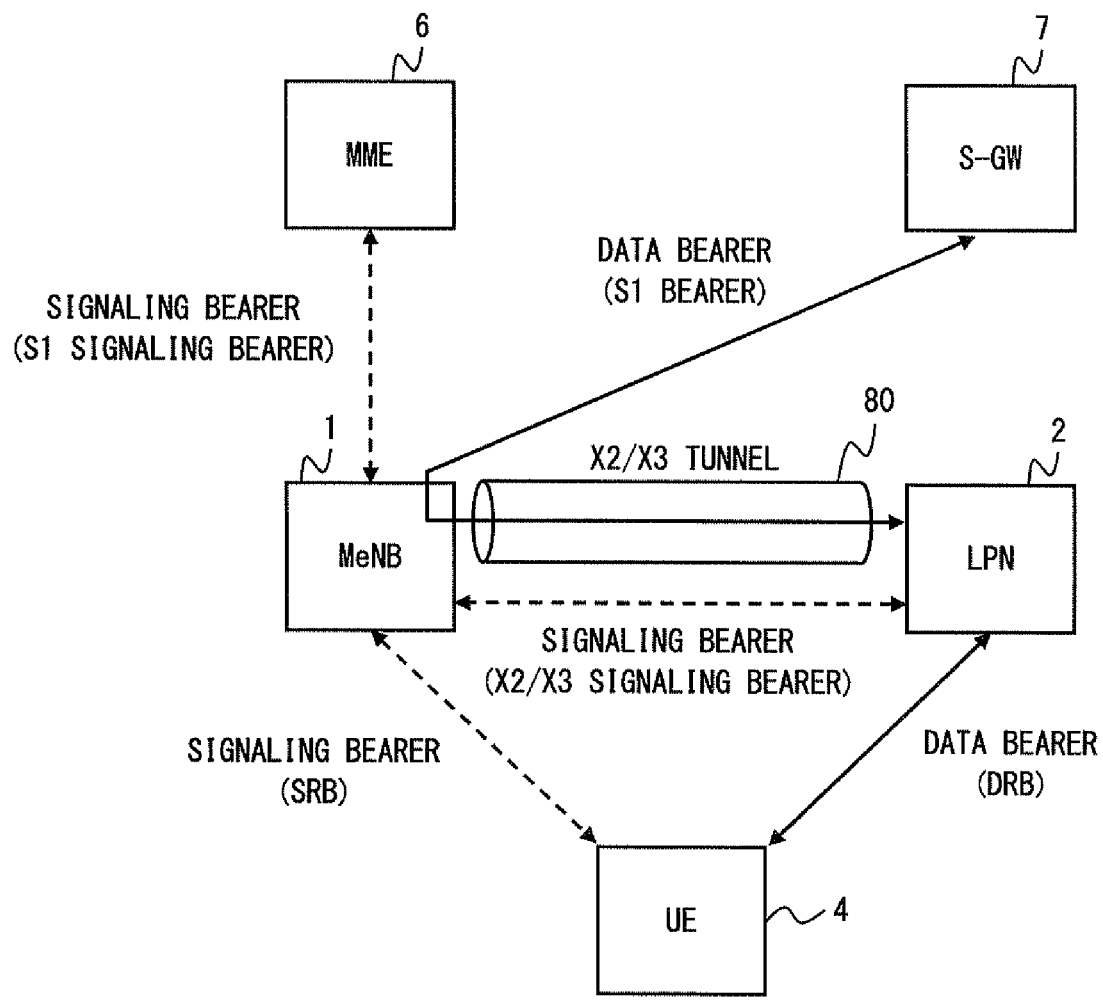
FIG. 3 is a diagram showing another example of the bearer architecture in the radio communication system according to the first embodiment.

FIG. 3 shows a second example of the bearer architecture. In the example shown in FIG. 3, the MeNB 1 performs routing and forwarding of the GTP tunnel packets. The MeNB 1 may have a proxy function to convert the IP addresses of the GTP tunnel packets. Specifically, the MeNB 1 and the LPN 2 set up a tunnel 80 (e.g., GTP Tunnel) via the X2/X3 interface. The MeNB 1 further encapsulates the GTP tunnel packets, which encapsulate the user data on the S1 bearer between the S-GW 7 and the LPN 2, and forwards the encapsulated GTP tunnel packets using the tunnel 80. The tunnel 80 may be omitted. That is, the MeNB 1 may directly forward the GTP tunnel packets without performing further encapsulation of the GTP tunnel packets.

One notable point in the example shown in FIG. 3 is that the MeNB 1 need not terminate the S1 bearer. The MeNB 1 is only required to operate as a router that forwards the GTP tunnel packets and need not perform decapsulation processing to retrieve user packets. Accordingly, an increased processing load on the MeNB 1 which is due to the GTP tunnel termination does not occur.

Another notable point in the example shown in FIG. 3 is that the MeNB 1 can monitor the GTP tunnel packets. The MeNB 1 can monitor, for example, the traffic amount of the GTP tunnel packets to be transferred. By monitoring the traffic amount of the GTP tunnel packets, the MeNB 1 can autonomously estimate the load on the cell 20 or the load on the LPN 2. Accordingly, the MeNB 1 according to the embodiment can determine deactivation of the cell 20 or the E-RAB that passes through the LPN 2, based on the traffic amount of the GTP tunnel packets monitored by the MeNB 1.

Next, configurations and operations of the apparatuses according to the embodiment will be described further in detail. When the UE 4 moves from the MeNB cell 10 to the MeNB cell 30, or when the primary cell (PCell) of the UE 4 is changed from the MeNB cell 10 to the MeNB cell 30, the MeNB 1 performs control to change the endpoint of the SRB for the C/U-Split of the UE 4 from the MeNB 1 to the MeNB 3. This control may be performed in accordance with the early part of the normal handover procedure (i.e., except for switching the route of the data bearer). Further, the MeNB 1 sends the LPN information to the MeNB 3 when the UE 4 moves from the MeNB cell 10 to the MeNB cell 30. The MeNB 1 may send the LPN information to the MeNB 3 while performing the handover procedure of the UE 4. The LPN information includes information that is necessary for the MeNB 3 to take over the C-Plane services for the C/U-Split of the UE 4 that has been performed in the MeNB 1. Specifically, the LPN information includes configuration information regarding the S1 bearer that has been established in the LPN 2. The LPN information may include configuration information of the DRB that has been established for the UE 4 in the cell 20.

When the UE 4 moves from the MeNB cell 10 to the MeNB cell 30, the MeNB 3 establishes the SRB with the UE 4 on the cell 30. The MeNB 3 uses the LPN information received from the MeNB 1 to provide, for the UE 4 in the cell 30, control of the DRB established in the cell 20 (SCell) for the UE 4. That is, the MeNB 3 provides the C-Plane services for the C/U-Plane Split in the cell 30 using the LPN information received from the source MeNB 1.

The LPN 2 may continue transfer of the user data through the S1 bearer and the DRB via the cell 20 while a procedure (e.g., handover procedure) for changing the endpoint of the SRB from the MeNB 1 to the MeNB 3 is being performed.

As already stated above, the radio communication system according to this embodiment employs the C/U Split architecture. Therefore, even when the UE 4 moves from the cell 10 to the cell 30, as long as the UE 4 is continuously located within the cell 20, the UE 4 can continuously use the S1 bearer and the SRB established in the LPN 2. Based on this point, the MeNB 1 according to the embodiment sends the LPN information to the MeNB 3 when the C-Plane is switched from the cell 10 to the cell 30. Accordingly, the MeNB 3 can use the LPN information to perform control of the DRB, which has been established for the UE 4 in the cell 20. It is thus possible in this embodiment to omit the path switch procedure from a source cell to a target cell (i.e., procedure for switching the route of the data bearer) executed in the later part of the normal handover procedure.

In the following description, configuration examples of the MeNB 1, the LPN 2, the MeNB 3, the UE 4, the MME 6, and the S-GW 7 according to this embodiment will be described. A radio communication unit 11 receives an uplink signal transmitted from the UE 4 via an antenna. A reception data processing unit 13 restores the received uplink signal that has been received. The resultant received data is transferred to another network node (e.g., the MME 6 or the S-GW 7) via a communication unit 14. For example, the uplink user data received from the UE 4 in the cell 10 is transferred to the S-GW 7. Further, NAS data among control data received from the UE 4 is transferred to the MME 6. Further, the reception data processing unit 13 receives from a controller 15 the control data to be transmitted to the LPN 2 or the MME 6 and sends the control data to the LPN 2 or the MME 6 via the communication unit 14.

A transmission data processing unit 12 acquires user data destined for the UE 4 from the communication unit 14, and generates a transport channel by performing error correction coding, rate matching, interleaving and the like on the user data. The transmission data processing unit 12 then generates a transmission symbol sequence by adding control information to the data sequence of the transport channel. The radio communication unit 11 generates a downlink signal by performing processing such as carrier wave modulation based on the transmission symbol sequence, frequency conversion, and signal amplification, and transmits the generated downlink signal to the UE 4. Furthermore, the transmission data processing unit 12 receives the control data to be transmitted to the UE 4 from the controller 15 and transmits the control data to the UE 4 via the radio communication unit 11.

The controller 15 of the MeNB 1 performs signaling with the MME 6, the LPN 2, the MeNB 3, and the UE 4 via the signaling bearers in order to enable the UE 4 to receive or transmit the user data through the cell 20 operated by the LPN 2. Specifically, the controller 15 sends an establishment request of the S1 bearer or the E-RAB to the MME 6 via the S1 signaling bearer. The controller 15 sends, to the LPN 2 via the X2/X3 signaling bearer, E-RAB configuration information that is necessary to establish the S1 bearer and the DRB in the LPN 2. The controller 15 transmits, to the UE 4 via the SRB in the cell 10, the DRB configuration information that is necessary to establish the DRB on the cell 20 in the UE 4.

The E-RAB configuration information includes S1 bearer configuration information and DRB configuration information. The S1 bearer configuration information includes information that is necessary to establish the S1 bearer with the S-GW 7. The S1 bearer configuration information includes, for example, at least one of an identifier of the E-RAB or the S1 bearer, QoS information of the E-RAB or the S1 bearer, an address of the S-GW 7, an endpoint identifier of the S1 bearer in the S-GW 7, and an identifier allocated to the UE 4. More specifically, the S1 bearer configuration information may include at least one of an E-RAB ID, a Quality Class Indicator (QCI), an IP address of the S-GW 7, an S-GW 7 side TEID of the GTP tunnel (S1 bearer), a security key, and a Temporary Mobile Subscriber Identity (TMSI) allocated to the UE 4. The DRB configuration information includes configuration information that is necessary to establish the DRB with the UE 4. The DRB configuration information may include, for example, the E-RAB ID, the Quality Class Indicator (QCI), and configuration information of the physical layer and the MAC sublayer.

Further, the controller 15 is configured to perform control to change, from the MeNB 1 to the MeNB 3, the SRB for the C/U-Split of the UE 4 when the UE 4 moves from the MeNB cell 10 to the MeNB cell 30. Further, the controller 15 is configured to send the LPN information to the MeNB 3 when the UE 4 moves from the MeNB cell 10 to the MeNB cell 30.

The LPN information includes, for example, at least one of an identifier of the LPN 2 (e.g., eNB ID), the identifier of the E-RAB or the S1 bearer (e.g., E-RAB ID), the QoS information (e.g., QCI) of the E-RAB or the S1 bearer, the endpoint identifier (e.g., TEID) of the S1 bearer in the LPN 2, the address of the S-GW 7 (e.g., IP address), and the endpoint identifier (e.g., TEID) of the S1 bearer in the S-GW 7.

Further, in some implementations, the controller 15 may be configured to send information regarding the target MeNB 3 (target MeNB information) to the LPN 2. The target MeNB information indicates that the base station that provides the C-Plane services in the C/U-Plane Split is changed from the MeNB 1 to the MeNB 3. The target MeNB information includes, for example, at least one of the identifier (e.g., eNB ID) of the MeNB 3 and connection information for connecting the MeNB 3 with the LPN 2 (e.g., X2/X3 interface connection information).

Figure 4:
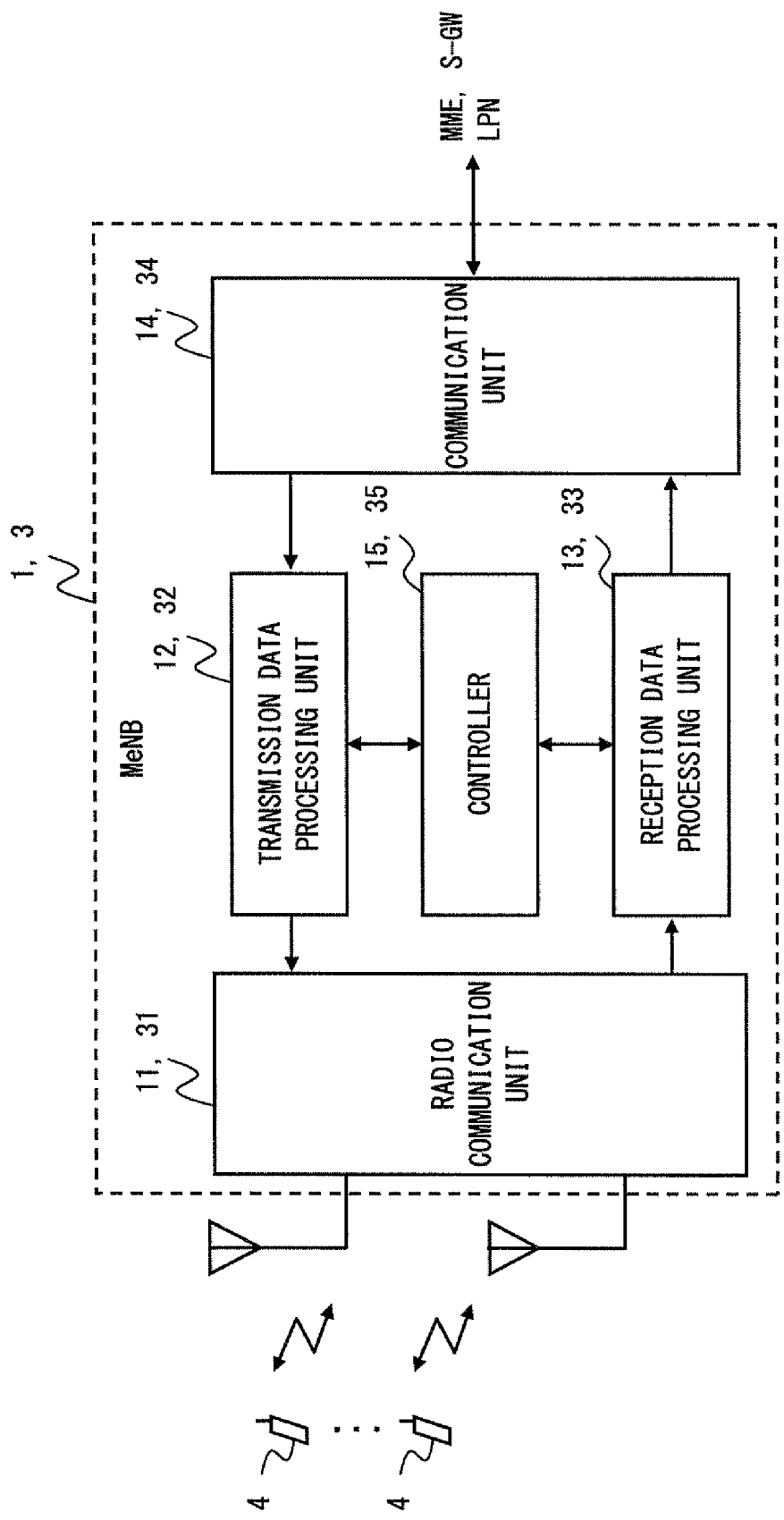
FIG. 4 is a diagram showing a configuration example of first and third base stations (e.g., MeNBs) according to the first embodiment.

The configuration example of the MeNB 3 is the same as the configuration example of the MeNB 1 shown in FIG. 4. The configurations and the operations of a radio communication unit 31, a transmission data processing unit 32, a reception data processing unit 33, and a communication unit 34 of the MeNB 3 are similar to those of the radio communication unit 11, the transmission data processing unit 12, the reception data processing unit 13, and the communication unit 14 of the MeNB 1.

A controller 35 of the MeNB 3 is configured to establish the SRB with the UE 4 on the cell 30 when the UE 4 moves from the MeNB cell 10 to the MeNB cell 30. The controller 35 is configured to use the LPN information received from the MeNB 1 to provide, for the UE 4 in the cell 30, the control of the DRB established in the cell 20 (SCell) for the UE 4.

Further, in some implementations, the controller 35 may be configured to send information regarding the target MeNB 3 (target MeNB information) to the LPN 2.

Figure 5:
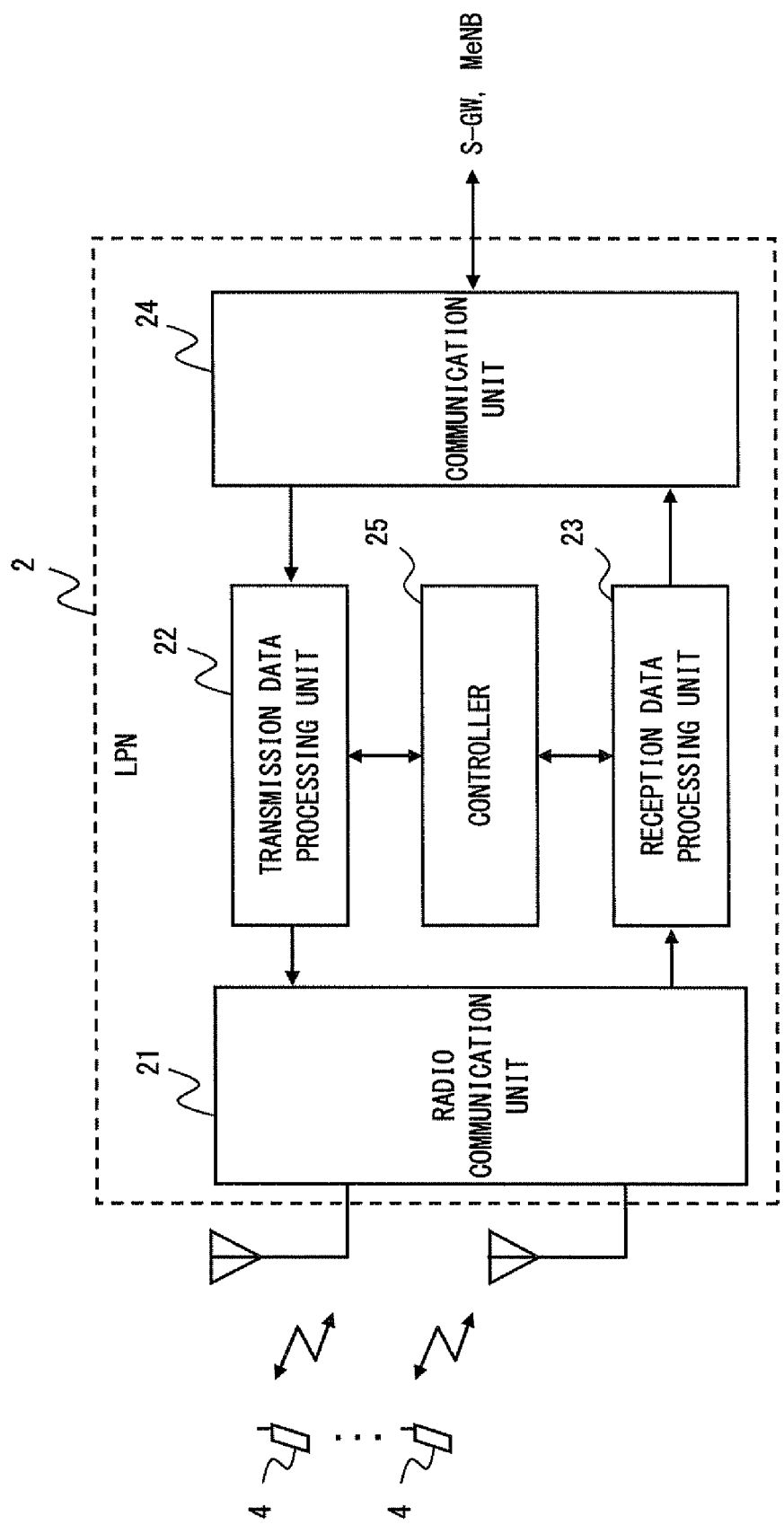
FIG. 5 is a diagram showing a configuration example of a second base station (e.g., LPN) according to the first embodiment.

FIG. 5 is a block diagram showing a configuration example of the LPN 2. The functions and the operations of a radio communication unit 21, a transmission data processing unit 22, a reception data processing unit 23, and a communication unit 24 shown in FIG. 5 are similar to those of the corresponding elements of the base station 1 shown in FIG. 4, i.e., the radio communication unit 11, the transmission data processing unit 12, the reception data processing unit 13, and the communication unit 14.

A controller 25 of the LPN 2 receives the E-RAB configuration information from the MeNB 1 (controller 15) via the X2/X3 signaling bearer, and sets up the S1 bearer with the S-GW 7 and the SRB with the UE 4 in accordance with the E-RAB configuration information. Further, the controller 25 may receive information regarding the target MeNB 3 (target MeNB information) from the MeNB 1 or the MeNB 3 when the UE 4 moves from the MeNB cell 10 to the MeNB cell 30. The controller 25 may update management information for the C/U-Plane split according to the target MeNB information.

Figure 6:
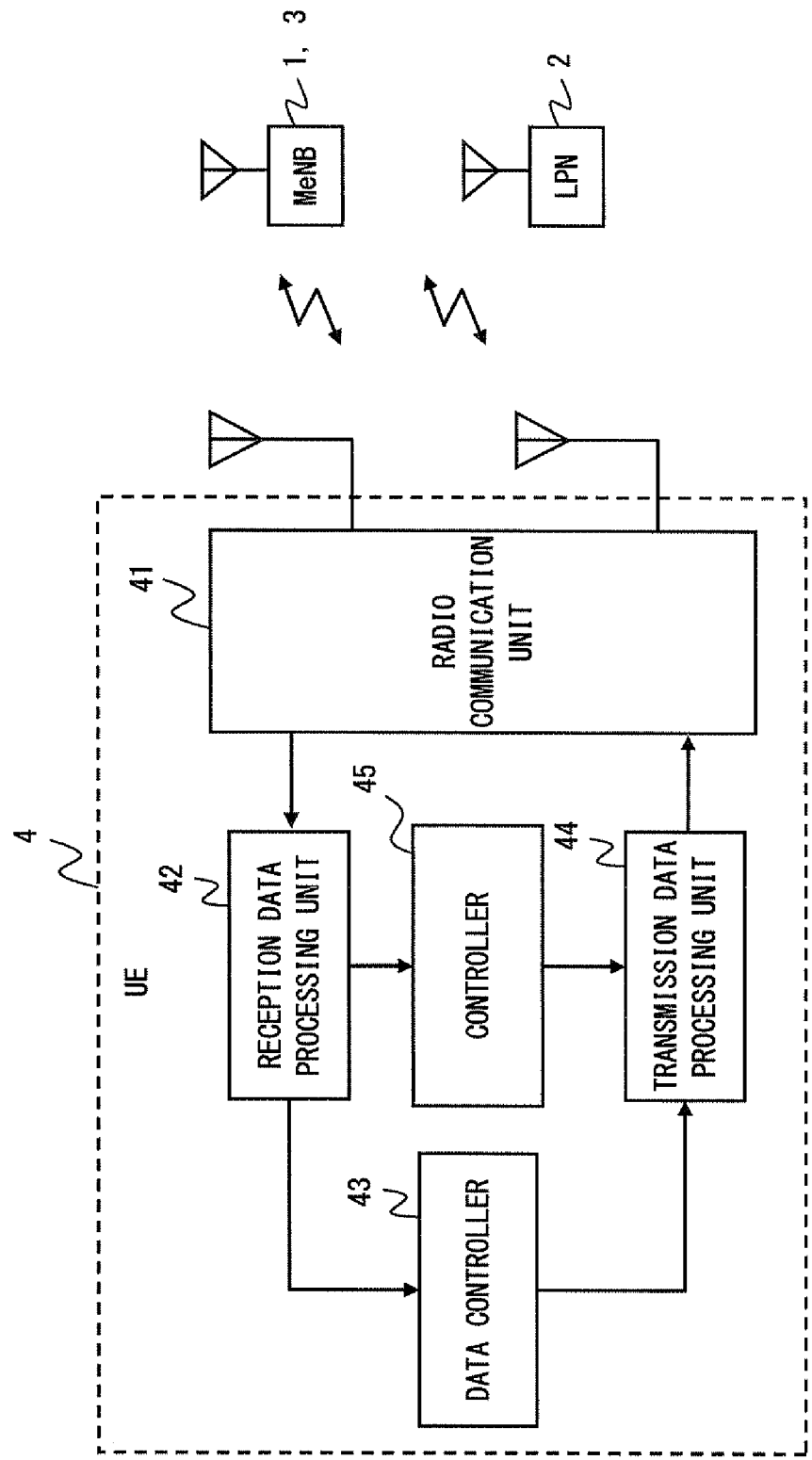
FIG. 6 is a diagram showing a configuration example of a mobile station (e.g., UE) according to the first embodiment.

FIG. 6 is a block diagram showing a configuration example of the UE 4. A radio communication unit 41 can communicate with the cell 10, the cell 20, and the cell 30. In addition, the radio communication unit 41 may support carrier aggregation of a plurality of cells operated by different eNBs. In this case, the radio communication unit 41 can simultaneously use the plurality of cells (e.g., the cells 10 (30) and 20) to transmit or receive user data. The radio communication unit 41 receives downlink signals from one or both of the eNB 1 (3) and the LPN 2 via an antenna. A reception data processing unit 42 restores received data from the received downlink signals, and sends the received data to a data controller 43. The data controller 43 uses the received data according to the purpose thereof. A transmission data processing unit 44 and the radio communication unit 41 generate an uplink signal using transmission data supplied from the data controller 43, and transmit the uplink signal to one or both of the eNB 1 (3) and the LPN 2.

A controller 45 of the UE 4 controls the radio communication unit 31 to establish the SRB with the MeNB 1 on the cell 10. The controller 45 then receives from the MeNB 1 the DBB configuration information to establish the DRB with the LPN 2 and controls the radio communication unit 41 to transmit or receive the user data through the cell 20. Accordingly, the UE 4 can communicate with the LPN 2 via the DRB based on the signaling with the MeNB 1.

Further, the controller 45 may control the radio communication unit 41 to establish the SRB with the MeNB 3 on the cell 30 when the UE 4 moves from the MeNB cell 10 to the MeNB cell 30. This allows the UE 4 to communicate with the LPN 2 via the DRB based on the signaling with the MeNB 3.

In the following description, with reference to a sequence diagram shown in FIG. 7, a specific example of a mobility procedure of the UE 4 according to the first embodiment will be described. In Step S101, the MeNB 1 establishes the S1 connection associated with the UE 4 with the MME 6 for the UE 4 which belongs to the cell 10. That is, the MeNB 1 establishes the S1 signaling bearer with the MME 6 on the S1-MME interface. Further, the MeNB 1 establishes the RRC connection with the UE 4 on the cell 10. Accordingly, the control data is transferred between the UE 4 and the MeNB 1, between the MeNB 1 and the MME 6, and between the UE 4 and the MME 6.

In Step S102, the S1 bearer and the DRB via the LPN 2 are established. That is, the E-RAB that passes through the LPN 2 is established between the UE 4 and the S-GW 7. The UE 4 receives or transmits user data through the cell 20 and the LPN 2.

In Steps S103 to S107, according to a movement of the UE 4 from the MeNB cell 10 to the MeNB cell 30, processing for changing the primary cell (PCell) is carried out. In Steps S103 to S105d, handover information is exchanged between the source MeNB 1 and the target MeNB 3. At this time, the LPN information regarding the LPN 2 is sent from the source MeNB 1 to the target MeNB 3. Specifically, in Step S103 shown in FIG. 7, the MeNB 1 determines a handover of the UE 4 to the cell 30 and sends a handover request to the MME 6. This handover request includes the LPN information regarding the LPN 2. In Step S104, the MME 6 sends handover information including the LPN information to the target MeNB 3. In Step S105, the source MeNB 1 receives a response to the handover request (e.g., HANDOVER REQUEST ACK) from the MME 6. Although Steps S103 to S105 show a procedure of the S1 handover in which the MME 6 participates, the signaling between the source MeNB 1 and the target MeNB 3 may be performed at the X2 interface between the MeNB 1 and the MeNB 3 without passing through the MME 6.

In Step S106, the source MeNB 1 transmits to the UE 4 an instruction of handover to the target MeNB 3 (HANDOVER COMMAND). In response to the handover command, the UE 4 establishes the RRC connection with the target MeNB 3 (Step S107). Accordingly, the UE 4 can receive or transmit user data through the cell 20 and the LPN 2 (Step S108), and can transmit and receive control data through the cell 30 and the MeNB 3.

In Step S110, the LPN 2 updates the management information for the C/U-Plane split using information regarding the target MeNB 3 (target MeNB information). As already stated above, the LPN 2 may receive the target MeNB information from the MeNB 1 or from the MeNB 3.

Figure 7:
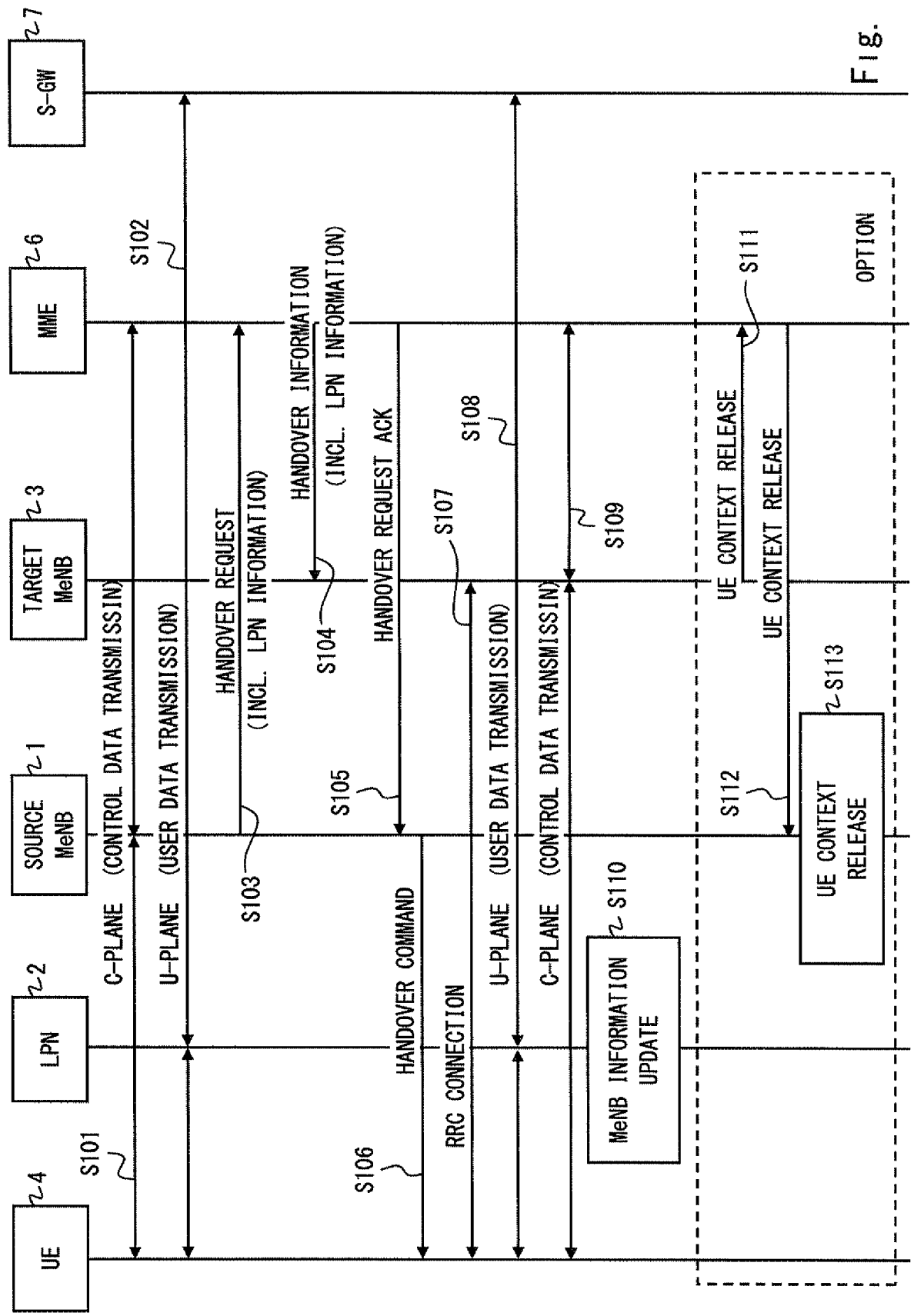
FIG. 7 is a sequence diagram showing one example of a mobility procedure of the mobile station according to the first embodiment.

In an optional procedure shown in FIG. 7, the source MeNB 1 and the target MeNB 3 may carry out processing for releasing the UE context when the handover is completed, similar to the normal handover procedure. In Steps S111 and S112, the source MeNB 1 receives, from the target MeNB 3, a request for releasing the UE context. In Step S113, the source MeNB 1 releases (deletes) the UE context that has been held regarding the UE 4.

Figure 8:
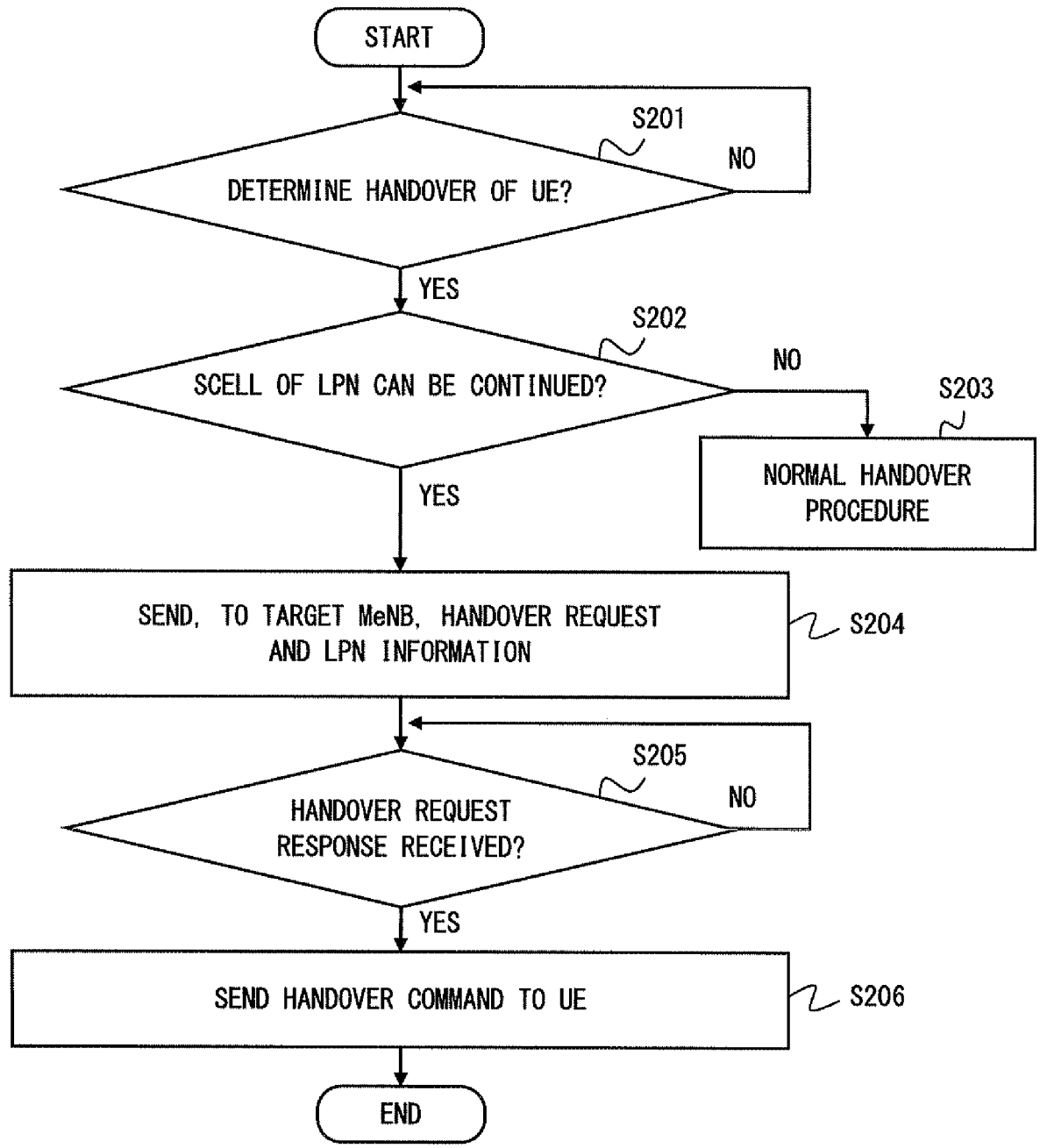
FIG. 8 is a flowchart showing an operation example of the first base station (e.g., MeNB) according to the first embodiment.

Next, in the following description, the operations of the source MeNB 1, the target MeNB 3, the LPN 2, and the UE 4 according to this embodiment will be described in order. FIG. 8 is a flowchart showing an operation example of the source MeNB 1. In Step S201, the MeNB 1 (controller 15) determines handover of the UE 4. When the handover is determined (YES in Step S201), the MeNB 1 determines whether it is possible to continue the SCell configured in the LPN 2 for the UE 4 (Step S202). When the SCell in the LPN 2 (NO in Step S202) cannot be continued, the MeNB 1 carries out the normal handover procedure (Step S203). On the other hand, when the SCell in the LPN 2 (YES in Step S202) can be continued, the MeNB 1 carries out processing of Step S204 and the following processing.

In Step S204, the MeNB 1 notifies the target MeNB 3 of the handover request and the LPN information. In Step S205, the MeNB 1 determines whether the acknowledgment in response to the handover request has been received from the target MeNB 3. When the acknowledgment has been received (YES in Step S205), the MeNB 1 instructs the UE 4 to perform the handover to the cell 30.

Figure 9:
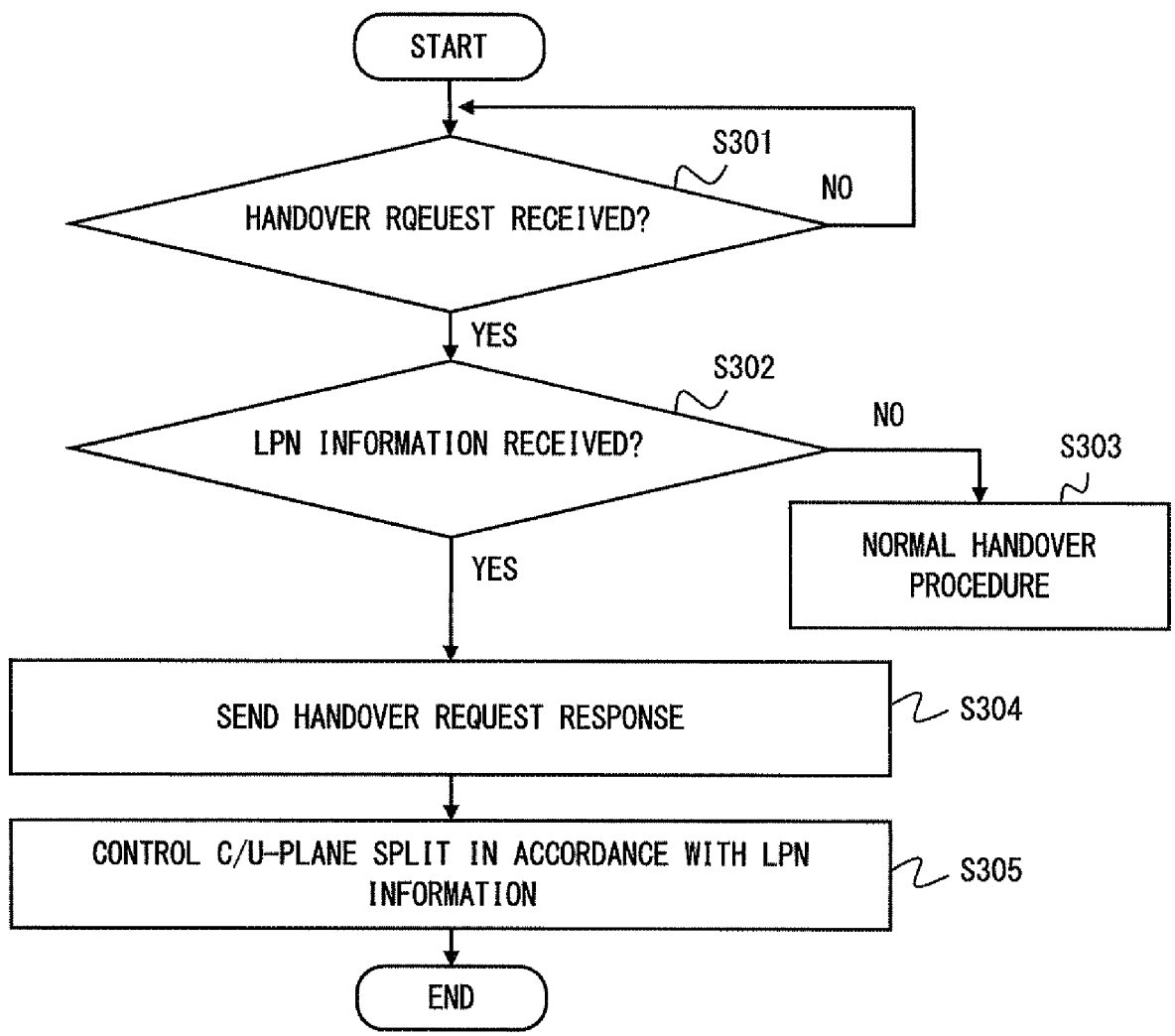
FIG. 9 is a flowchart showing an operation example of the third base station (e.g., MeNB) according to the first embodiment.

FIG. 9 is a flowchart showing an operation example of the target MeNB 3. In Step S301, the MeNB 3 determines whether the handover request has been received. When the handover request has been received (YES in Step S301), the MeNB 3 further determines whether the LPN information has been received (Step S302). When the LPN information has not been received (NO in Step S302), the MeNB 3 carries out the normal handover procedure (Step S303). On the other hand, when the LPN information has been received (YES in Step S302), the MeNB 3 carries out processing of Step S304 and the following processing.

In Step S304, the MeNB 3 sends a response to the handover request to the source MeNB 1. In Step S305, the MeNB 3 updates the management information regarding the C/U-Plane Split of the UE 4 based on the LPN information regarding the LPN 2. That is, the MeNB 3 controls the C/U-Plane Split of the UE 4 in accordance with the LPN information.

Figure 10:
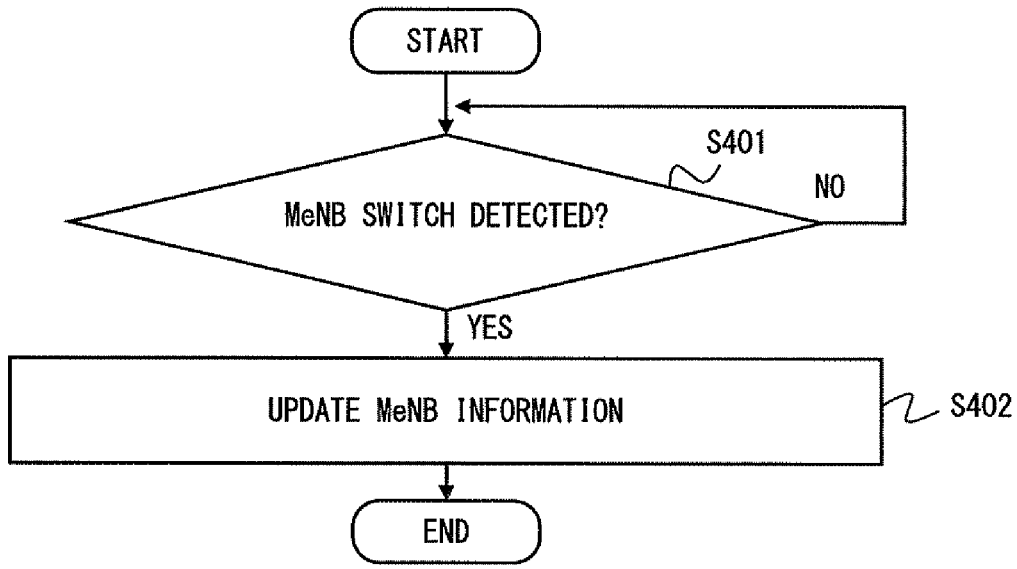
FIG. 10 is a flowchart showing an operation example of the second base station (e.g., LPN) according to the first embodiment.

FIG. 10 is a flowchart showing an operation example of the LPN 2. In Step S401, the LPN 2 determines whether the switch of the MeNB has been detected. When the switch from the MeNB 1 to the MeNB 3 has been detected (YES in Step S401), the LPN 2 updates the management information for the C/U-Plane split of the UE 4 based on the information regarding the MeNB 3 (target MeNB information).

Figure 12:
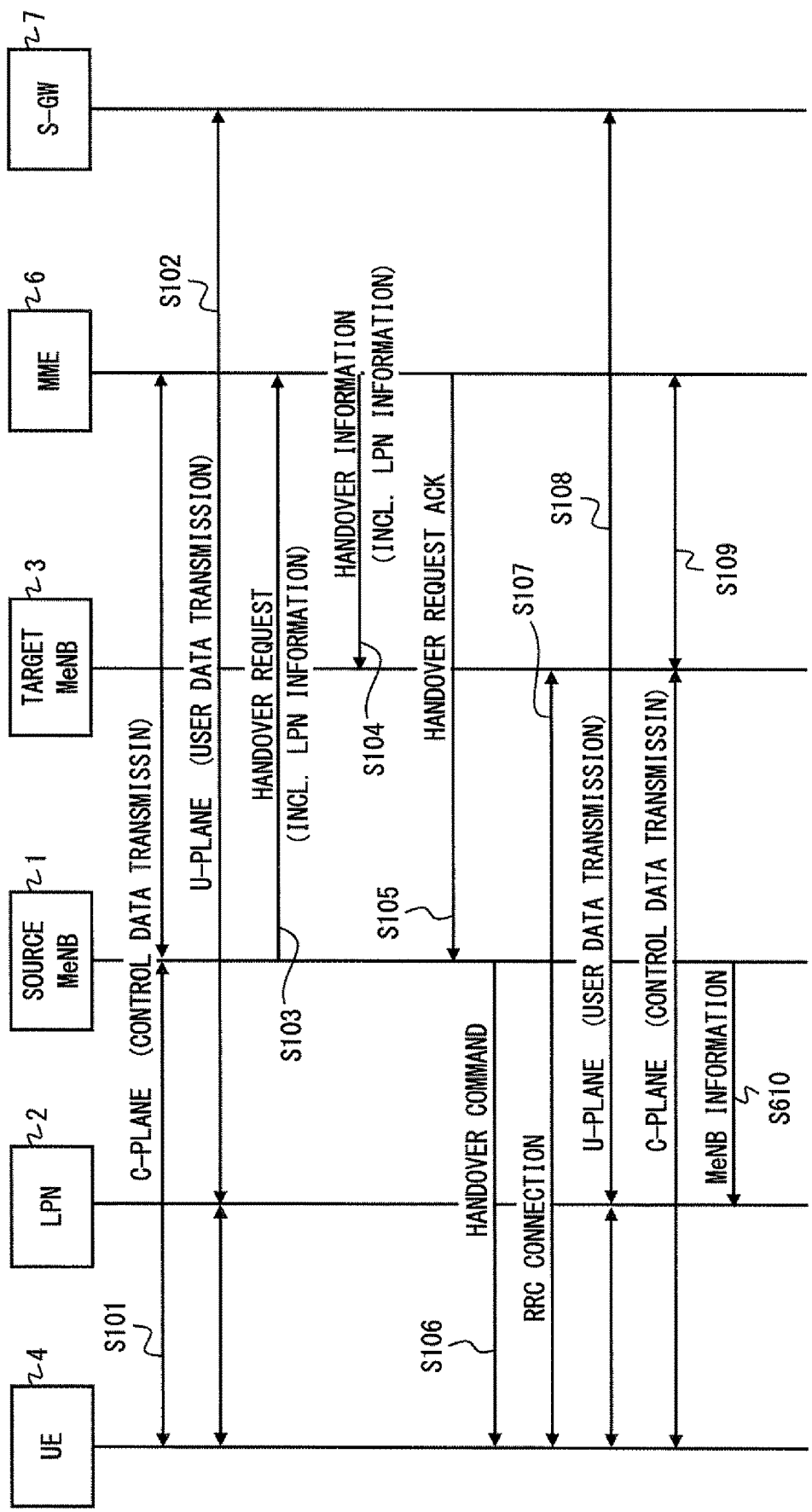
FIG. 12 is a sequence diagram showing one example of a mobility procedure of a mobile station according to a second embodiment.

FIG. 12 is a flowchart showing an operation example of the UE 4. In Step S501, the UE 4 determines whether the handover command has been received from the MeNB 1. When the handover command has been received (YES in Step S501), the UE 4 performs handover to the target MeNB 3.

Second Embodiment

In this embodiment, a specific example of updating the MeNB information in the LPN 2 will be described. Specifically, in this embodiment, the LPN 2 receives information regarding the MeNB 3 (target MeNB information) from the source MeNB 1 and updates the management information for the C/U-Plane split of the UE 4 in accordance with the target MeNB information.

FIG. 12 is a sequence diagram showing a specific example of the mobility procedure of the UE 4 according to this embodiment. The processing in Steps S101 to S109 shown in FIG. 12 is similar to the processing in Steps S101 to S109 shown in FIG. 7. In Step S610 shown in FIG. 12, the LPN 2 receives the target MeNB information from the source MeNB 1. The LPN 2 updates the management information for the C/U-Plane split of the UE 4 using the received target MeNB information.

Figure 13:
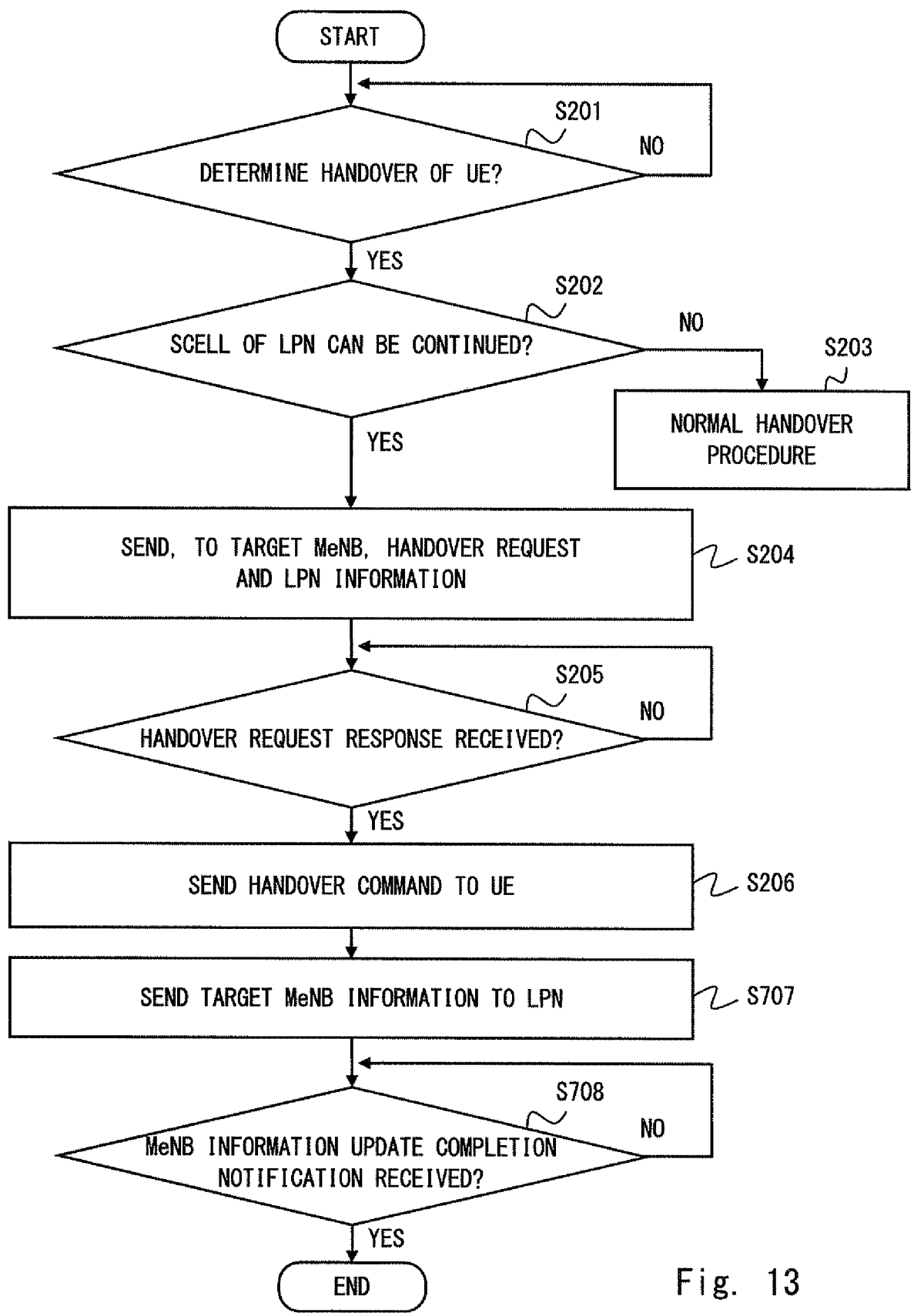
FIG. 13 is a flowchart showing an operation example of a first base station (e.g., MeNB) according to the second embodiment.

FIG. 13 is a flowchart showing an operation example of the source MeNB 1 according to this embodiment. The processing in Steps S201 to S206 shown in FIG. 13 is similar to the processing in Steps S201 to S206 shown in FIG. 8. In Step S707 shown in FIG. 13, the MeNB 1 sends to the LPN 2 the target MeNB information regarding the MeNB 3. In Step S708, the MeNB 1 determines whether a notification of completion of updating the MeNB information (C/U-Plane split management information in the LPN 2) has been received from the LPN 2, and ends the processing in FIG. 13 when the completion notification has been received.

Figure 14:
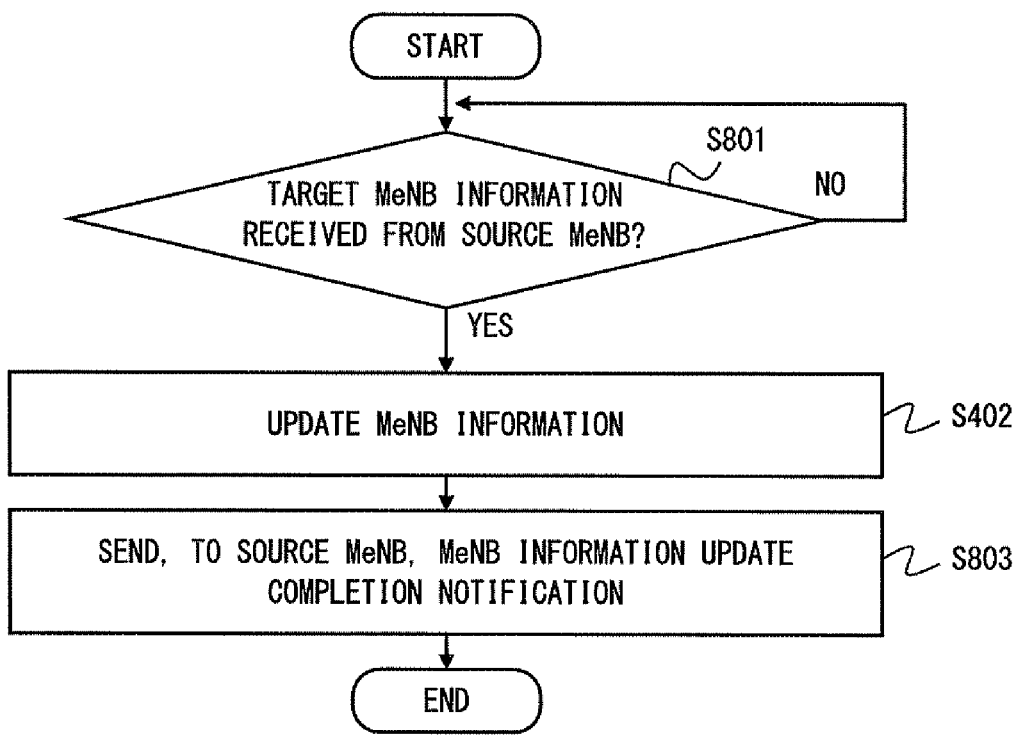
FIG. 14 is a flowchart showing an operation example of a second base station (e.g., LPN) according to the second embodiment.

FIG. 14 is a flowchart showing an operation example of the LPN 2 according to this embodiment. In Step S801, the LPN 2 determines whether the target MeNB information has been received from the source MeNB 1. When the target MeNB information has been received (YES in Step S801), the LPN 2 updates management information for the C/U-Plane split of the UE 4 using the received target MeNB information (Step S802). In Step S803, the LPN 2 sends to the MeNB 1 the notification of completion of updating the MeNB information (C/U-Plane split management information in the LPN 2).

Third Embodiment

This embodiment shows another specific example of updating the MeNB information in the LPN 2. More specifically, in this embodiment, the LPN 2 receives information regarding the MeNB 3 (target MeNB information) from the target MeNB 3 and updates management information for the C/U-Plane split of the UE 4 in accordance with the target MeNB information.

Figure 15:
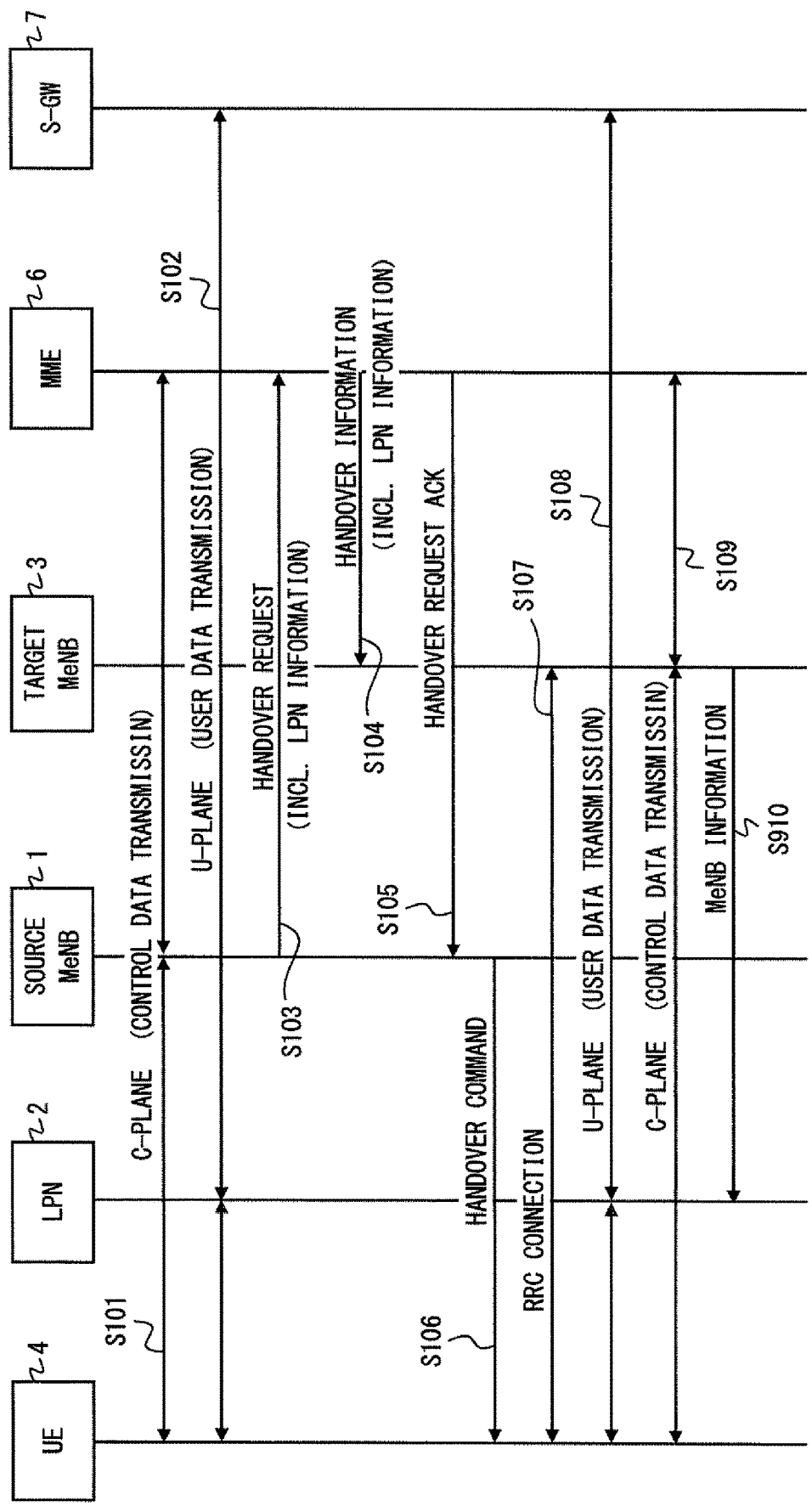
FIG. 15 is a sequence diagram showing one example of a mobility procedure of a mobile station according to a third embodiment.

FIG. 15 is a sequence diagram showing a specific example of the mobility procedure of the UE 4 according to this embodiment. The processing in Steps S101 to S109 shown in FIG. 15 is similar to the processing in Steps S101 to S109 shown in FIG. 7. In Step S910 shown in FIG. 15, the LPN 2 receives the target MeNB information from the target MeNB 3. The LPN 2 updates the management information for the C/U-Plane split of the UE 4 using the received target MeNB information.

Figure 16:
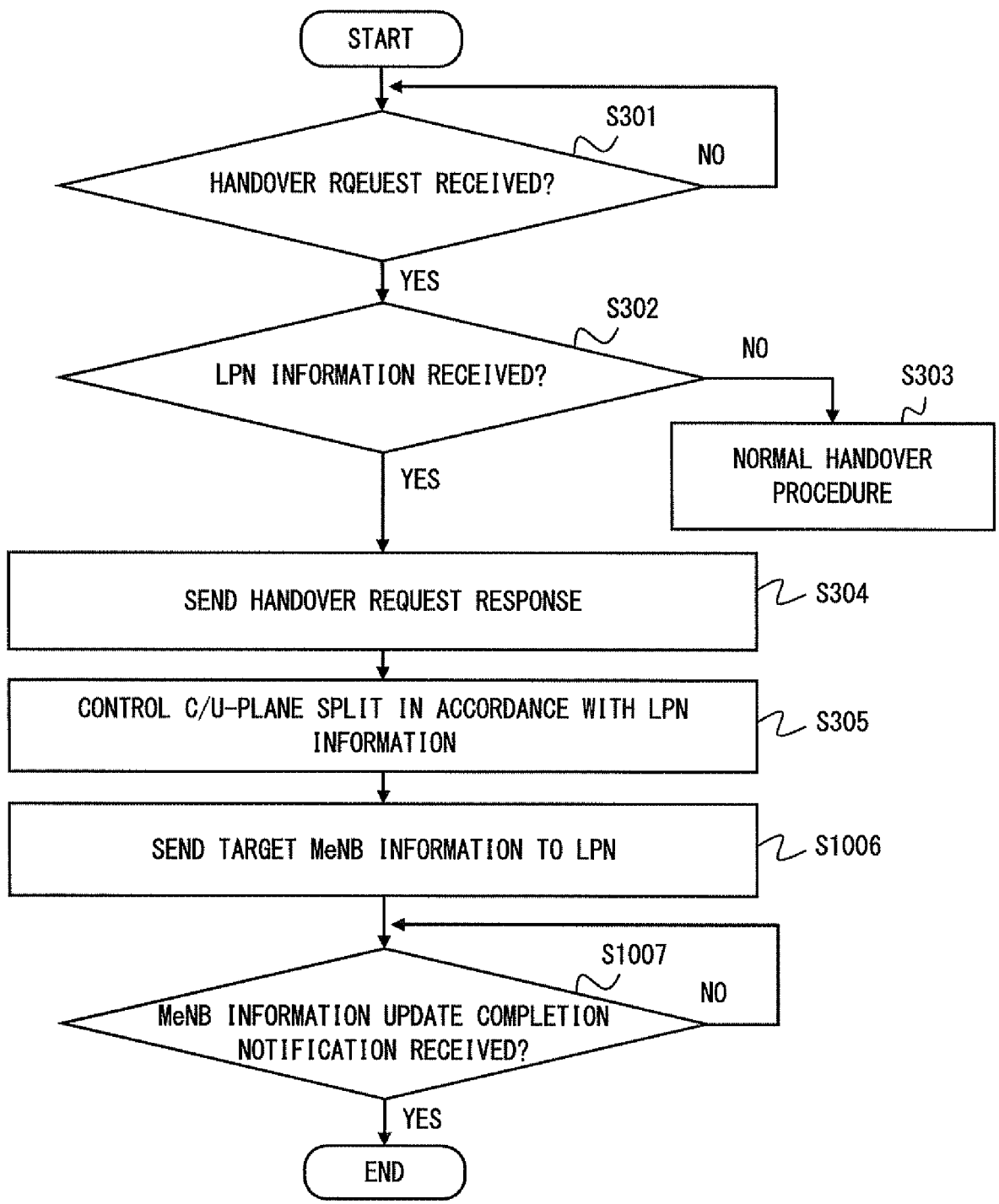
FIG. 16 is a flowchart showing an operation example of a third base station (e.g., MeNB) according to the third embodiment.

FIG. 16 is a flowchart showing an operation example of the target MeNB 3 according to this embodiment. The processing in Steps S301 to S305 shown in FIG. 16 is similar to the processing in Steps S301 to S305 shown in FIG. 9. In Step S1006 shown in FIG. 16, the MeNB 3 sends to the LPN 2 the target MeNB information regarding the MeNB 3. In Step S1007, the MeNB 3 determines whether a notification of completion of updating the MeNB information (C/U-Plane split management information in the LPN 2) has been received from the LPN 2, and ends the processing in FIG. 16 when the completion notification has been received.

Figure 17:
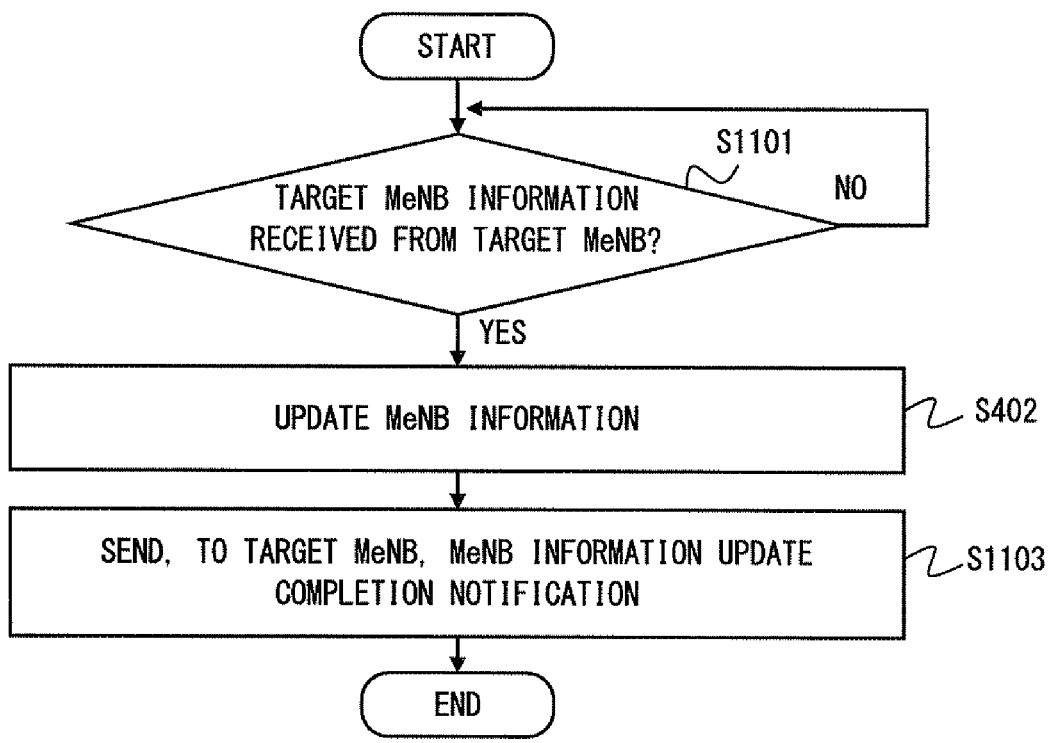
FIG. 17 is a flowchart showing an operation example of a second base station (e.g., LPN) according to the third embodiment.

FIG. 17 is a flowchart showing an operation example of the LPN 2 according to this embodiment. In Step S1101, the LPN 2 determines whether the target MeNB information has been received from the target MeNB 3. When the target MeNB information has been received (YES in Step S1101), the LPN 2 updates the management information for the C/U-plane split of the UE 4 using the received target MeNB information (Step S1102). In Step S1103, the LPN 2 sends to the MeNB 3 the notification of completion of updating the MeNB information (C/U-Plane split management information in the LPN 2).

Fourth Embodiment

This embodiment shows a modified example of the first to third embodiments. More specifically, in this embodiment, the source MeNB 1 is configured to, when handover to the target MeNB 3 is performed, notify the UE 4 whether to continue the communication through the cell 20 (SCell) of the LPN 2 or not. In other words, the MeNB 1 is configured to, when the endpoint of the SRB for the UE 4 is changed from the MeNB 1 to the MeNB 3, send to the UE 4 a notification message indicating the continuation of the SCell or continuation of the DRB in the SCell.

According to the current specification of the carrier aggregation in the 3GPP, all the SCell settings are released when handover is performed. In this embodiment, the source MeNB 1 explicitly instructs the UE 4, in which the SCell has been configured, to continue the use of the SCell. This allows the source MeNB 1 to control whether to continue or release the SCell settings of the UE 4 that performs handover.

Figure 18:
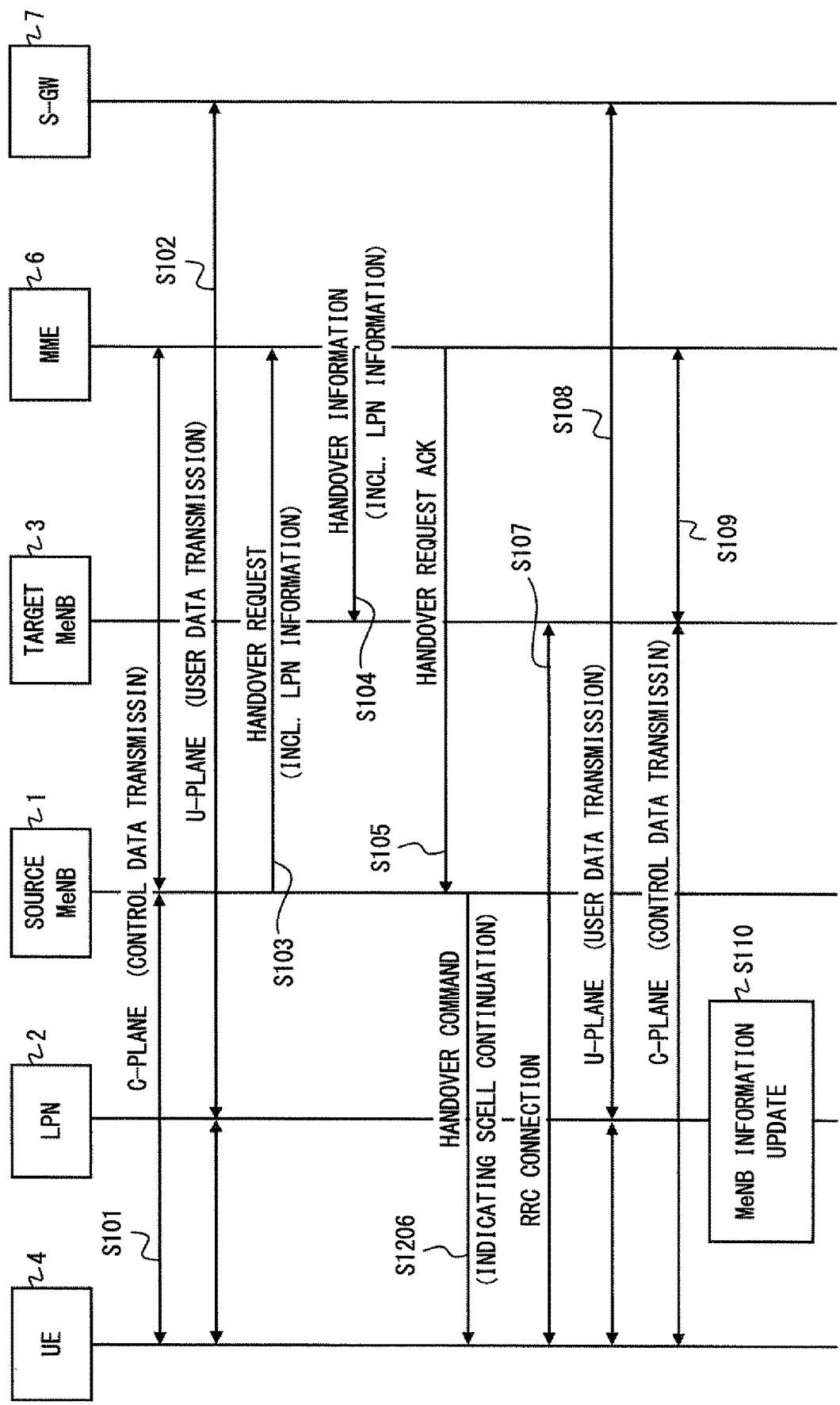
FIG. 18 is a sequence diagram showing one example of a mobility procedure of a mobile station according to the third embodiment.

FIG. 18 is a sequence diagram showing a specific example of the mobility procedure of the UE 4 according to this embodiment. The processing in Steps S101 to S105 shown in FIG. 18 is similar to the processing in Steps S101 to S105 shown in FIG. 7. In Step S1206 shown in FIG. 18, the source MeNB 1 sends a handover command indicating whether to continue the use of the SCell. The indication of whether to continue the use of the SCell may be transmitted using a message other than the handover command. The processing in Steps S107 to S110 shown in FIG. 18 is similar to the processing in Steps S101 to S110 shown in FIG. 7. Although FIG. 18 shows a modified example of the sequence diagram shown in FIG. 7 according to the first embodiment, the transmission of the message indicating whether to continue the use of the SCell may be applied to the sequence diagram shown in FIG. 12 or 15.

Figure 19:
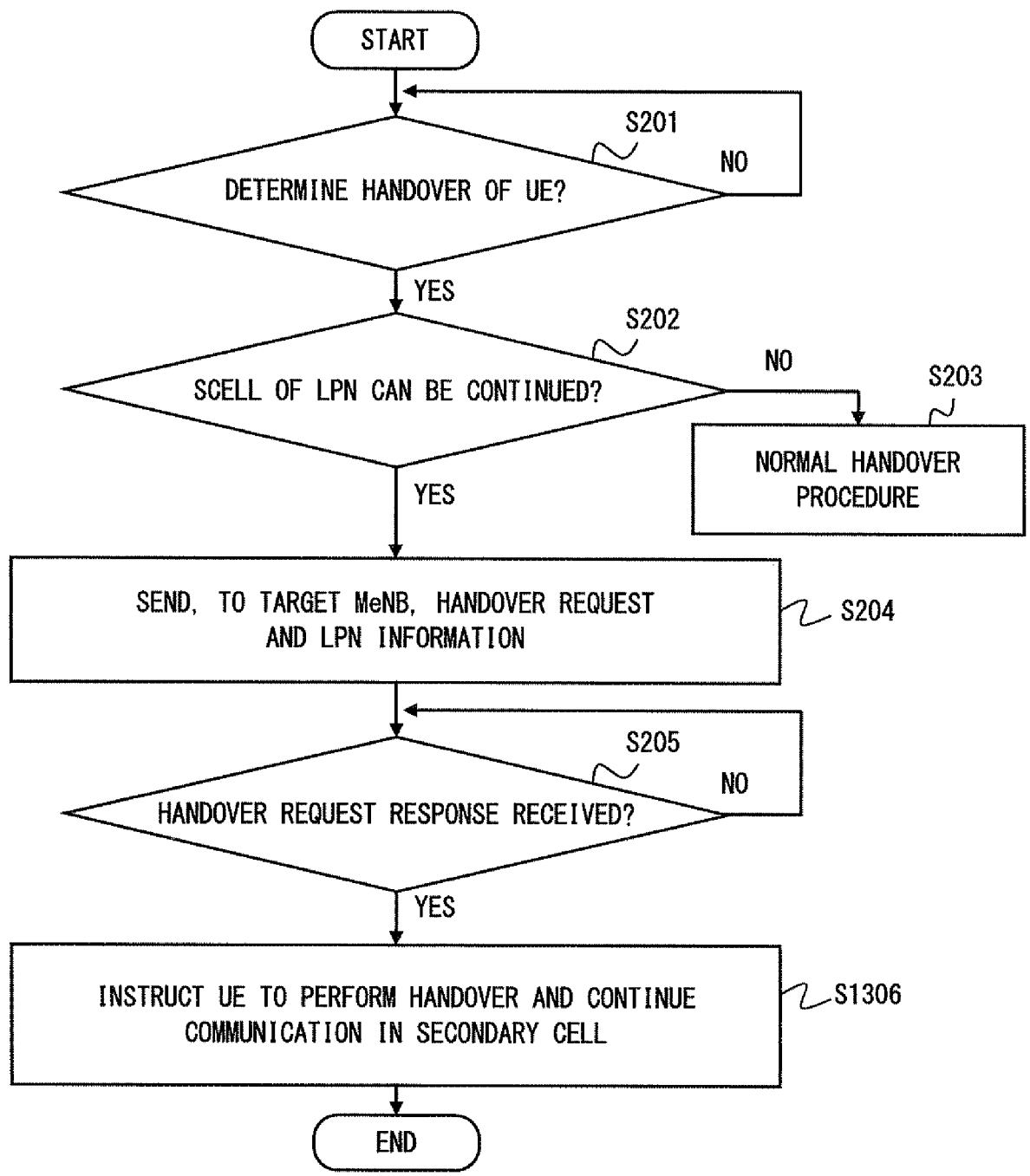
FIG. 19 is a flowchart showing an operation example of a first base station (e.g., MeNB) according to the third embodiment.

FIG. 19 is a flowchart showing an operation example of the source MeNB 1 according to this embodiment. The processing in Steps S201 to S205 shown in FIG. 19 is similar to the processing in Steps S201 to S205 shown in FIG. 8. In Step S1306 shown in FIG. 19, the MeNB 1 instructs the UE 4 to perform handover and continue transmission in the cell 20 (SCell).

Figure 11:
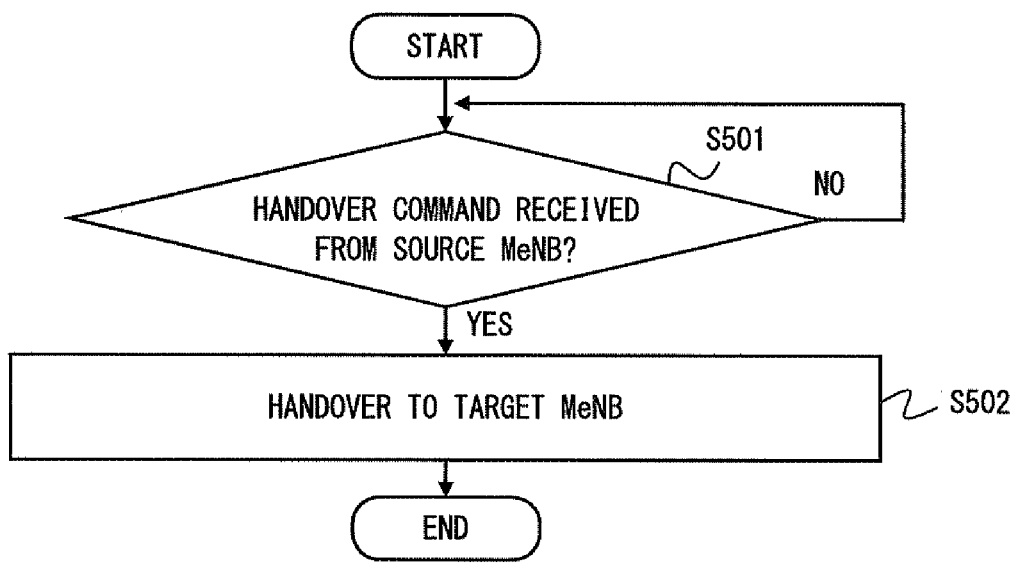
FIG. 11 is a flowchart showing an operation example of the mobile station (e.g., UE) according to the first embodiment.
Figure 20:
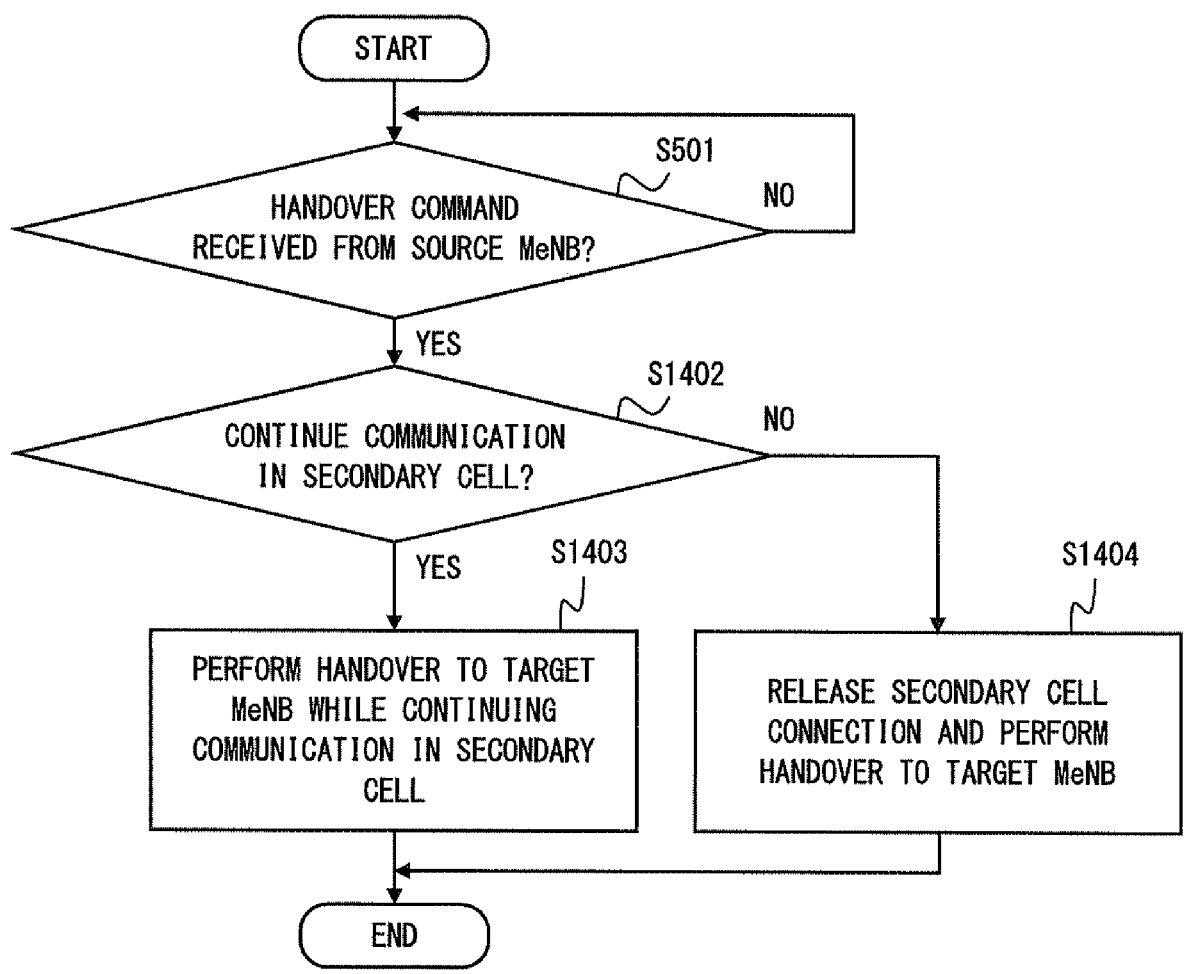
FIG. 20 is a flowchart showing an operation example of a mobile station (e.g., UE) according to the third embodiment.

FIG. 20 is a flowchart showing an operation example of the UE 4 according to this embodiment. The processing in Step S501 shown in FIG. 20 is similar to the processing in Step S501 shown in FIG. 11. In Step S1402, the UE 4 determines whether an instruction to continue the communication in the SCell has been received from the source MeNB 1. When the instruction to continue the communication in the SCell has been received (YES in Step S1402), the UE 4 is handed over to the target MeNB 3 while continuing the communication in the SCell. On the other hand, when the instruction to continue the communication in the SCell has not been received (NO in Step S1402), the UE 4 stops the communication in the SCell and releases the SCell connection, and is handed over to the target MeNB 3.

Other Embodiments

The aforementioned first to fourth embodiments may be combined as appropriate.

All the communication control methods in the C/U-plane split scenario by the MeNB 1, the LPN 2, the MeNB 3, and the UE 4 described in the first to fourth embodiments may be implemented by using a semiconductor processing device including an Application Specific Integrated Circuit (ASIC). Alternatively, these methods may be implemented by causing a computer system including at least one processor (e.g., microprocessor, Micro Processing Unit (MPU), Digital Signal Processor (DSP)) to execute a program. Specifically, one or more programs including instructions to cause a computer system to perform the algorithms shown in the flowcharts and the sequence diagrams may be created and these programs may be supplied to a computer.

These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide a program to a computer via a wired communication line (e.g., electric wires, and optical fibers) or a wireless communication line.

In the above first to fourth embodiments, the LTE system has been mainly described. However, these embodiments may be applied to radio communication systems other than the LTE system, for example, a 3GPP Universal Mobile Telecommunications System (UMTS), 3GPP2 CDMA2000 system (1×RTT, High Rate Packet Data (HRPD)), a Global System for Mobile Communications (GSM) system, or a WiMAX system.

Further, the above embodiments are merely examples of applications of technical ideas obtained by the present inventors. Needless to say, these technical ideas are not limited to the above embodiments and may be changed in various ways.

This application is based upon and claims the benefit of priority from Japanese Patent Application No. 2012-288210, filed on Dec. 28, 2012, the disclosure of which is incorporated herein in its entirety by reference.

REFERENCE SIGNS LIST

1 BASE STATION (MeNB)
2 BASE STATION (LPN)
3 BASE STATION (MeNB)
4 MOBILE STATION (UE)
5 CORE NETWORK (EPC)
6 MOBILITY MANAGEMENT APPARATUS (MME)
7 DATA TRANSFER APPARATUS (S-GW)
15 CONTROLLER
25 CONTROLLER
35 CONTROLLER
45 CONTROLLER
62 BEARER SETUP CONTROLLER
75 BEARER CONTROLLER
80 TUNNEL

The invention claimed is:

1. A radio communication system comprising:
a source Master base station;
a secondary base station;
a target Master base station; and
a User Equipment (UE); wherein:
the source Master base station is configured to send, to the target Master base station, a request of handover of the UE from the source Master base station to the target Master base station, the request including an identifier of the secondary base station and at least one of: an identifier of the UE provided by the secondary base station and an identifier of an E-UTRAN Radio Access Bearer (E-RAB) of the secondary base station;
the target Master base station is configured to send, to the source Master base station, a response after receiving the request of handover;
the source Master base station is configured to send, to the UE, information for configuration of a Radio Resource Control (RRC) connection including the identifier of the E-RAB of the secondary base station to perform the handover, wherein the sending of the information for configuration of the RRC connection causes the UE to apply configuration of a cell of the secondary base station, with the identifier of the E-RAB of the secondary base station; and
the UE is configured to synchronize, based on the information for configuration of the RRC connection, to the target Master base station and to establish an RRC connection with the target Master base station.

2. The radio communication system according to the claim 1, wherein
the target Master base station is configured to send, to the secondary base station, a message regarding to the target Master base station, the message including an information regarding to X2 interface between the target Master base station and the secondary base station; and
the secondary base station is configured to send, to the target Master base station, a response to the message regarding to the target Master base station.

3. A source Master base station comprising:
a memory storing instructions; and
at least one hardware processor configured to process the instructions to:
transmit, from the source Master base station to a target Master base station, a request of handover of a user equipment (UE) from the source Master base station to the target Master base station, the request including an identifier of a Secondary base station and at least one of: an identifier of the UE provided by the secondary base station, and an identifier of an E-UTRAN Radio Access Bearer (E-RAB) of the secondary base station; and
transmit, to the UE, information for configuration of a Radio Resource Control (RRC) connection including the identifier of E-RAB of the secondary base station to perform the handover, wherein the transmission of the information for configuration of the RRC connection causes the UE to apply configuration of a cell of the secondary base station, with the identifier of the E-RAB of the secondary base station.

4. A target Master base station comprising:
a memory storing instructions; and
at least one hardware processor configured to process the instructions to:
receive, from a source Master base station, a request of handover of a user equipment (UE) from the source Master base station to the target Master base station, the request including an identifier of a Secondary base station and at least one of: an identifier of the UE provided by the secondary base station and an identifier of an E-UTRAN Radio Access Bearer (E-RAB) of the secondary base station;
synchronize, based on the request, to the UE; and
establish a Radio Resource Control (RRC) connection with the UE.

5. The source Master base station according to the claim 3, wherein the at least one hardware processor is further configured to process the instructions to:
  receive, from the target Master base station, a response to the request of handover.

6. The target Master base station according to the claim 4, wherein the at least one hardware processor is configured to process the instructions to:
  send, to the source Master base, a response after receiving the request of handover.

7. The target Master base station according to the claim 4, wherein the at least one hardware processor is configured to process the instructions to:
  send, to the secondary base station, a message regarding to the target Master base station, the message including an information regarding to X2 interface between the target Master base station and the secondary base station; and
  receive, from the secondary base station, a response to the message regarding to the target Master base station.

* * * * *